US008433683B2

(12) United States Patent
Shoens et al.

(10) Patent No.: US 8,433,683 B2

(45) Date of Patent: Apr. 30, 2013

(54) SYSTEMS AND METHODS OF DATA REPLICATION OF A FILE SYSTEM

(75) Inventors: Kurt Alan Shoens, Los Altos, CA (US); Rex Rilen Hamilton, Ben Lomond, CA (US)

(73) Assignee: Oracle International Corporation, Redwood City, CA (US)

( * ) Notice: Subject to any disclaimer, the term of this patent is extended or adjusted under 35 U.S.C. 154(b) by 68 days.

(21) Appl. No.: 13/134,525

(22) Filed: Jun. 8, 2011

(65) Prior Publication Data

US 2012/0317079 A1 Dec. 13, 2012

(51) Int. Cl.
*G06F 7/00* (2006.01)
*G06F 17/00* (2006.01)

(52) U.S. Cl.
USPC .................... 707/639; 707/634; 707/638

(58) Field of Classification Search .................. 707/634, 707/638, 639
See application file for complete search history.

(56) References Cited

U.S. PATENT DOCUMENTS 7,379,954 B2 * 5/2008 Shoens .................... 1/1
7,756,844 B2 * 7/2010 Shoens et al. .............. 707/695
7,836,029 B2 * 11/2010 Shoens .................... 707/695
2005/0086241 A1 * 4/2005 Ram et al. ................. 707/100
2006/0271604 A1 * 11/2006 Shoens .................... 707/201
2009/0006496 A1 * 1/2009 Shoens et al. ............. 707/203
2009/0030983 A1 * 1/2009 Malaiyandi et al. ......... 709/204
2009/0265396 A1 * 10/2009 Ram et al. ................ 707/204
2010/0179959 A1 * 7/2010 Shoens .................... 707/758
2011/0106763 A1 * 5/2011 Madan et al. .............. 707/639
2011/0246416 A1 * 10/2011 Prahlad et al. ............ 707/610
2011/0246430 A1 * 10/2011 Prahlad et al. ............ 707/679

* cited by examiner

*Primary Examiner* — Shew-Fen Lin
(74) *Attorney, Agent, or Firm* — Marsh Fischmann & Breyfogle, LLP; Daniel J. Sherwinter

(57) ABSTRACT

The invention relates to methods for replicating a primary file system on a primary host to a secondary file system on a secondary host including determining a primary data block to replicate by reading a space map block entry (b, e) of the primary data block, wherein b represents the first snapshot and e the last snapshot to use the primary data block; computing a checksum of a primary data block and sending its number to the secondary host and determining a secondary data block that corresponds and computing its checksum then comparing the primary and secondary data block checksums and replicating the primary data block on the secondary file system when the primary and secondary checksums mismatch for the primary file system. In another aspect of the method if the primary and secondary checksums mismatch the method sends all data blocks from the primary file system allocated after a reliable snapshot on the secondary file system to the secondary host to be written on the secondary file system.

13 Claims, 41 Drawing Sheets

Block Management

Remove Obsoleted Snapshots from Index Table

Remove Deleted Snapshots from Index Table

Clean Obsolete Snapshots

Clean Deleted Snapshots

Multiple File System Reversions
To Snapshot "p" And To Snapshot "s"
Prior To Completing Background Cleaning Process

| Image Name | Timestamp | Freeable Space (GB) |
|---|---|---|
| ☐ Daily 1 | 04/06/2006 | 0 |
| ☐ Daily 2 | 04/08/2006 | 0 |
| ☐ Daily 3 | 04/10/2006 | 0 |
| ☐ Daily 4 | 04/12/2006 | 0 |
| ☒ Weekly 1 | 04/02/2006 | 1150 |
| ☐ Weekly 2 | 04/09/2006 | 0 |
| ☐ Monthly 1 | 04/01/2006 | 0 |
| ☐ Monthly 2 | 05/01/2006 | 0 |

Total GB: 1150

[Delete Snapshots]   [Clear Selections]

| Image Name | Timestamp | Freeable Space (GB) |
|---|---|---|
| ☐ Daily 1 | 04/06/2006 | 0 |
| ☐ Daily 2 | 04/08/2006 | 0 |
| ☐ Daily 3 | 04/10/2006 | 0 |
| ☒ Daily 4 | 04/12/2006 | 700 |
| ☒ Weekly 1 | 04/02/2006 | 1300 |
| ☐ Weekly 2 | 04/09/2006 | 0 |
| ☐ Monthly 1 | 04/01/2006 | 0 |
| ☐ Monthly 2 | 05/01/2006 | 0 |

Total GB 2000

[Delete Snapshots] [Clear Selections]

First Space Map Block

| 0 | 0 | 3 1 | 0 0 | 0 0 | 0 0 | 0 1 0 | 0 0 |
|---|---|-----|-----|-----|-----|-------|-----|

Second Space Map Block

| 0 0 | 2 2 | 0 0 | 0 0 | 0 0 | 3 1 | 0 0 | 0 0 |
|-----|-----|-----|-----|-----|-----|-----|-----|

Snapspace Matrix

|  e \ b | 0 | 1 | 2 | 3 |
|---|---|---|---|---|
| 3 | 0 | 0 | 0 | 0 |
| 2 | 0 | 0 | 1 | 0 |
| 1 | 0 | 0 | 0 | 2 |
| 0 | 10 | 1 | 0 | 0 |

Snapspace Matrix

Process B-tree Leaf Block

Find File Names For An Inode

| b \ e | 0 | 1 | 2 | 3 |
|---|---|---|---|---|
| 0 | 10 | 0 | 0 | 0 |
| 1 | 16 | 0 | 0 | 0 |
| 2 | 0 | 0 | 1 | 0 |
| 3 | 0 | 0 | 0 | 7 |
Snapspace Matrix
FIGURE 41C
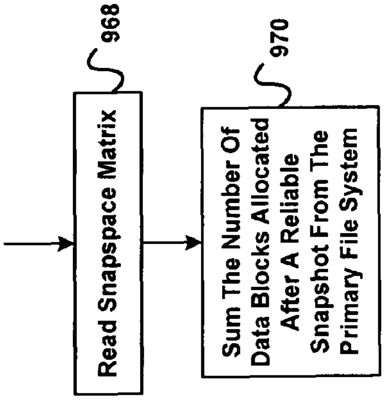
FIGURE 41B
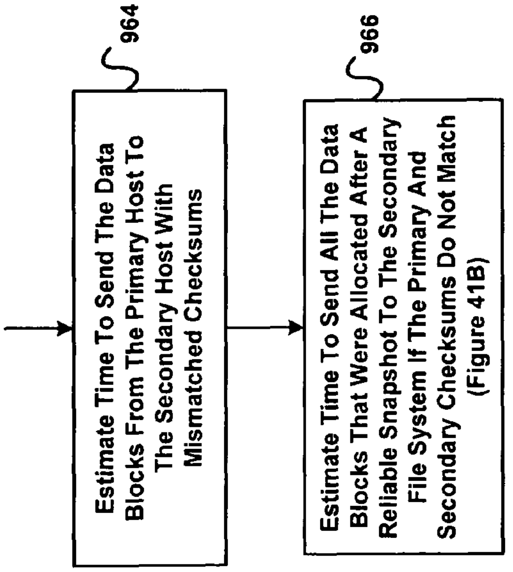
FIGURE 41A

SYSTEMS AND METHODS OF DATA REPLICATION OF A FILE SYSTEM

BACKGROUND

The present invention relates to data replication of file systems in data storage systems.

This application incorporates by reference herein as follows:

U.S. application Ser. No. 10/264,603, Systems and Methods of Multiple Access Paths to Single Ported Storage Devices, filed on Oct. 3, 2002, now abandoned;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003, now U.S. Pat. No. 7,216,253 B2;

U.S. application Ser. No. 10/440,347, Methods and Systems of Cache Memory Management and Snapshot Operations, filed on May 16, 2003, now U.S. Pat. No. 7,124,243 B2;

U.S. application Ser. No. 10/600,417, Systems and Methods of Data Migration in Snapshot Operations, filed on Jun. 19, 2003, now U.S. Pat. No. 7,136,974 B2;

U.S. application Ser. No. 10/616,128, Snapshots of File Systems in Data Storage Systems, filed on Jul. 8, 2003, now U.S. Pat. No. 6,959,313 B2;

U.S. application Ser. No. 10/677,560, Systems and Methods of Multiple Access Paths to Single Ported Storage Devices, filed on Oct. 1, 2003, now abandoned;

U.S. application Ser. No. 10/696,327, Data Replication in Data Storage Systems, filed on Oct. 28, 2003, now U.S. Pat. No. 7,143,122 B2;

U.S. application Ser. No. 10/837,322, Guided Configuration of Data Storage Systems, filed on Apr. 30, 2004, now U.S. Pat. No. 7,216,192 B2;

U.S. application Ser. No. 10/975,290, Staggered Writing for Data Storage Systems, filed on Oct. 27, 2004, now U.S. Pat. No. 7,380,157 B2;

U.S. application Ser. No. 10/976,430, Management of I/O Operations in Data Storage Systems, filed on Oct. 29, 2004, now U.S. Pat. No. 7,222,223 B2;

U.S. application Ser. No. 11/122,495, Quality of Service for Data Storage Volumes, filed on May 4, 2005, now U.S. Pat. No. 7,418,531 B2;

U.S. application Ser. No. 11/147,739, Methods of Snapshot and Block Management in Data Storage Systems, filed on Jun. 7, 2005, now U.S. Pat. No. 7,257,606 B2;

U.S. application Ser. No. 11/245,718, Multiple Quality of Service File System, filed on Oct. 8, 2005, now abandoned;

U.S. application Ser. No. 11/407,491, Management of File System Snapshots, filed on Apr. 19, 2006, now U.S. Pat. No. 7,379,954 B2;

U.S. application Ser. No. 11/408,209, Methods and Systems of Cache Memory Management and Snapshot Operations, filed on Apr. 19, 2006, now U.S. Pat. No. 7,380,059 B2;

U.S. application Ser. No. 12/075,020, Methods of Processing Files in a Multiple Quality of Service File System, filed on Mar. 7, 2008;

U.S. application Ser. No. 12/154,494, Management of File System Snapshots, filed on May 23, 2008, now U.S. Pat. No. 7,756,844 B2; and U.S. application Ser. No. 12/586,682, Systems and Methods of Searching for and Determining Modified Blocks in a File System, filed on Sep. 25, 2009, now U.S. Pat. No. 7,836,029 B2.

Files exist to store information on storage devices (e.g., magnetic disks) and allow the information to be retrieved later. A file system is a collection of files and directories plus operations on them. To keep track of files, file systems have directories. A directory entry provides the information needed to find the blocks associated with a given file. Many file systems today are organized in a general hierarchy (i.e., a tree of directories) because it gives users the ability to organize their files by creating subdirectories. Each file may be specified by giving the absolute path name from the root directory to the file. Every file system contains file attributes such as each file owner and creation time and must be stored somewhere such as in a directory entry.

A snapshot of a file system will capture the content (i.e., files and directories) at an instant in time. A snapshot results in two data images: (1) the active data that an application can read and write as soon as the snapshot is created and (2) the snapshot data. Snapshots can be taken periodically, hourly, daily, or weekly or on user demand. They are useful for a variety of applications including recovery of earlier versions of a file following an unintended deletion or modification, backup, data mining, or testing of software.

The need for high data availability may require frequent snapshots that consume resources such as memory, internal memory bandwidth, storage device capacity and the storage device bandwidth. Some important issues for snapshots of file systems is how to manage the allocation of space in the storage devices, how to keep track of the blocks of a given file, and how to make snapshots of file systems work efficiently and reliably.

Many enterprises require an extra copy of each data block of a file system if the primary data storage system fails. Tape backup can provide the copy but is too slow for regular access to the data and is time consuming to restore to faster storage devices such as disk drives. Data replication provides a solution by sending a copy of each data block of a primary file system to those of a secondary file system so that the data blocks can be quickly accessed if and when the primary data storage system fails.

A file system can be corrupted due to a software defect or due to defective hardware. There is a need to force data replication back into sync when a secondary file system has a corrupted data block. When a corrupt data block is detected on the secondary file, the secondary file system could return an error and/or quarantine the corrupted data block, but the corrupted data block will not get re-replicated if it has not been modified by the primary host. When a corrupt data block is detected on the secondary file, another approach is to replicate all the data blocks of the primary file system, but this may be impractical for a data storage system processing large file systems.

SUMMARY OF THE INVENTION

The invention relates to methods for replicating a primary file system on a primary host to a secondary file system on a secondary host. In a first aspect of the invention, a method includes determining the primary data block to replicate by reading a space map block entry (b, e) of the primary data block, wherein b represents the first snapshot and e the last snapshot to use the primary data block; computing a checksum of a primary data block of the primary file system to replicate on the secondary file system; sending the primary data block number from the primary host to the secondary host; using the number of the primary data block to determine a secondary data block that corresponds to the primary data block; computing a checksum of the secondary data block of the secondary file system; comparing the primary and secondary data block checksums on the primary host or the secondary host; and replicating the primary data block on the secondary file system when the primary and secondary data block checksums mismatch, and repeating the above steps for the remaining data blocks of the primary file system, wherein the primary data block belongs to one or more snapshots of the primary file system.

In a second aspect of the invention, a method includes determining a data block of the primary file system to replicate on the secondary file system; sending the number of the data block to the secondary host; computing a secondary checksum of a corresponding data block on the secondary host; sending the secondary checksum to the primary host; and computing a primary checksum of the data block on the primary file system, and if the primary and secondary checksums do not match, sending all data blocks from the primary file system that were allocated after a reliable snapshot on the secondary file system to the secondary host, and writing the data blocks to the secondary file system.

In another aspect of the invention, a method (a) determining a data block of the primary file system to replicate on the secondary file system; (b) sending the number of the data block to the secondary host; (c) computing a secondary checksum of a corresponding data block on the secondary host; (d) computing a primary checksum of the data block on the primary file system; (e) sending the data block from the primary host to the secondary host if the primary and secondary checksums do not match and repeating the above steps for all the other data blocks of the primary file system, or (f) sending all the data blocks that were allocated after a reliable snapshot to the secondary file system from the primary host to the secondary host if the primary and secondary checksums do not match; (g) selecting step (e) or step (f) based on an estimated time to complete the data replication; and (h) writing the data blocks to the secondary file system.

BRIEF DESCRIPTION OF THE DRAWINGS

FIG. 41A illustrates a method to estimate the time to replicate from a reliable snapshot and the time to continue to replicate from checksum comparisons.

FIG. 41B illustrates a method to estimate the time to replicate the remaining data blocks from the primary file system by summing the data blocks allocated after a reliable snapshot.

FIG. 41C illustrates how the primary host can read a snapspace matrix to estimate the time to replicate the remaining data blocks from the primary file system by summing the data blocks allocated after a reliable snapshot.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
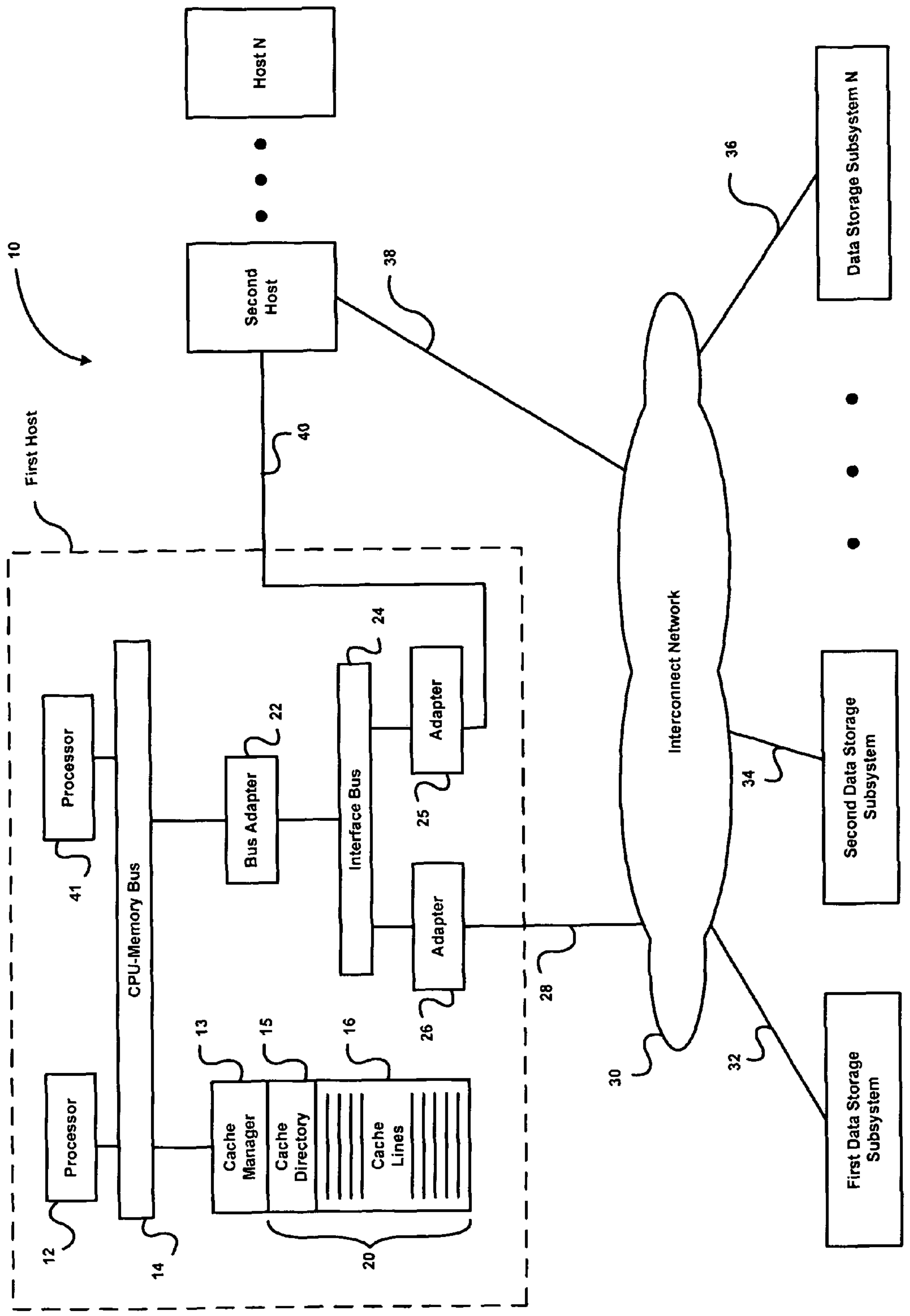
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Ethernet, Fibre Channel, ATM, and SCSI, and InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a motherboard with a CPU-memory bus 14 that communicates with dual processors 12 and 41. The processor used is not essential to the invention and could be any suitable processor such as the Intel Pentium 4 processor. A processor could be any suitable general purpose processor running software, an ASIC dedicated to perform the operations described herein or a field programmable gate array (FPGA). Also, one could implement the invention using a single processor in each host or more than two processors to meet more stringent performance requirements. The arrangement of the processors is not essential to the invention.

The first host cache memory 20 includes a cache manager 13, a cache directory 15, and cache lines 16. The cache memory 20 is nonvolatile memory or volatile memory or a combination of both. Nonvolatile memory protects data in the event of a power interruption or a host failure. Data is defined as including user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

A computer-readable medium (e.g., storage device, CD, DVD, floppy card, USB storage device) can be used to encode the software program instructions described in the methods below.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests, but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *IP SANs: A Guide to iSCSI, iFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending U.S. patent application Ser. No. 10/264,603, entitled, Systems and Methods of Multiple Access Paths to Single Ported Storage Devices, filed on Oct. 3, 2002, and incorporated herein by reference. It is understood, however, that other storage device(s) or data storage subsystems could be used instead of the data storage subsystem described in that U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same type of I/O path plus link 32 to communicate with the first data storage subsystem, or link 34 to communicate with the second data storage subsystem, or link 36 to the data storage subsystem N.

Figure 2:
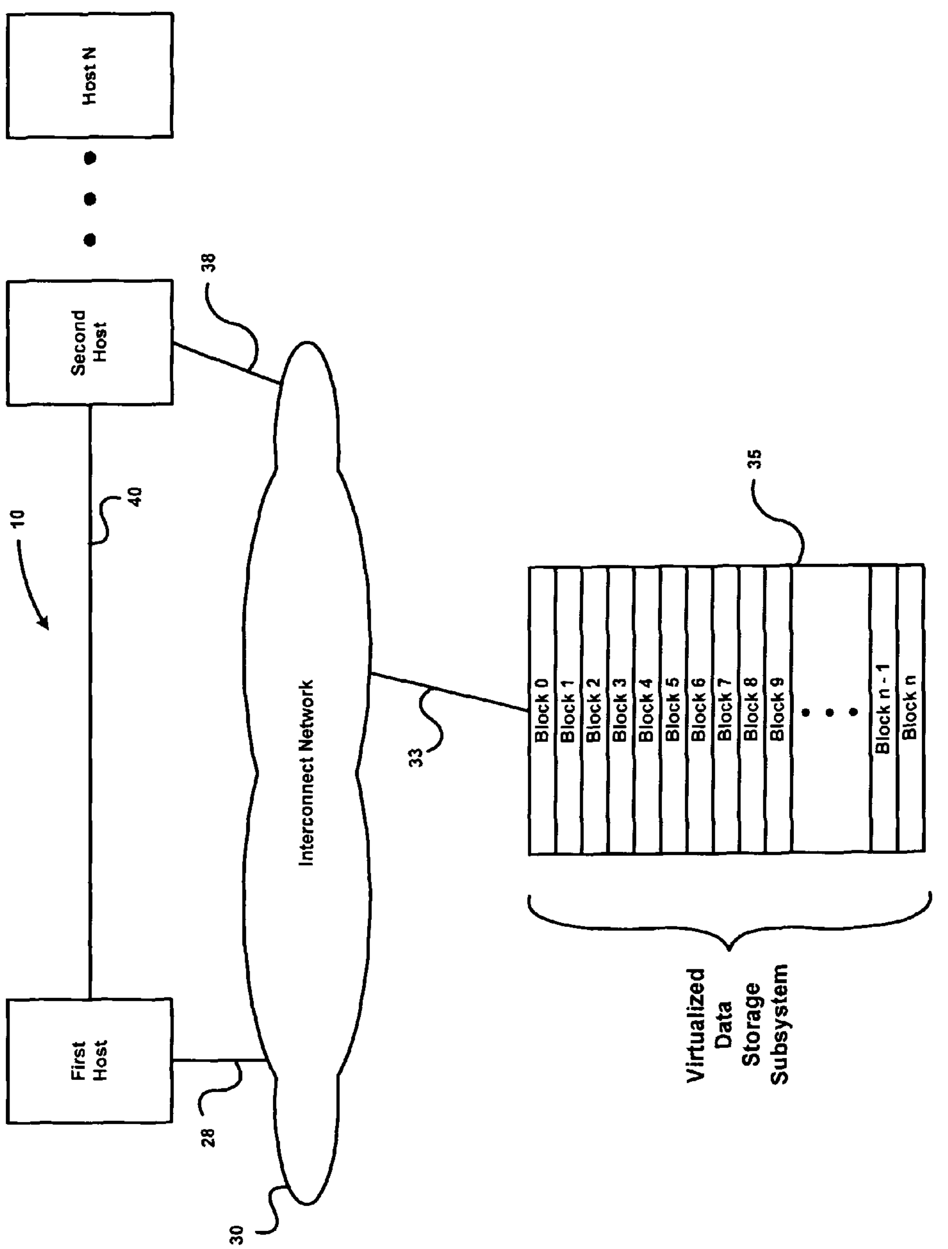
FIG. 2 illustrates the data storage as a virtualized storage subsystem.

FIG. 2 illustrates that each host of the data storage system can store and retrieve files from a data storage subsystem 35 using an interconnect 28, an interconnect 33, and an interconnect network 30. In an embodiment, each storage device in the data storage subsystem is assigned a logical unit number (LUN) that is an identifier for the storage device. A virtual logical unit number (VLUN) is as an abstraction of the storage device(s) or the virtualization of the data storage subsystems such as a linear array of blocks as it appears to the data storage system users. In various embodiments, the implementation of a VLUN may be striped (i.e., spread) over multiple RAID groups for added performance, spread over sections of a RAID group for flexibility, or copied on multiple RAID groups for reliability. As shown, the storage devices of the data storage subsystem are virtualized as a file system employing contiguous fixed sized blocks O-n where the size of each block is some value preferably 1-KB to 64-KB.

Figure 3:
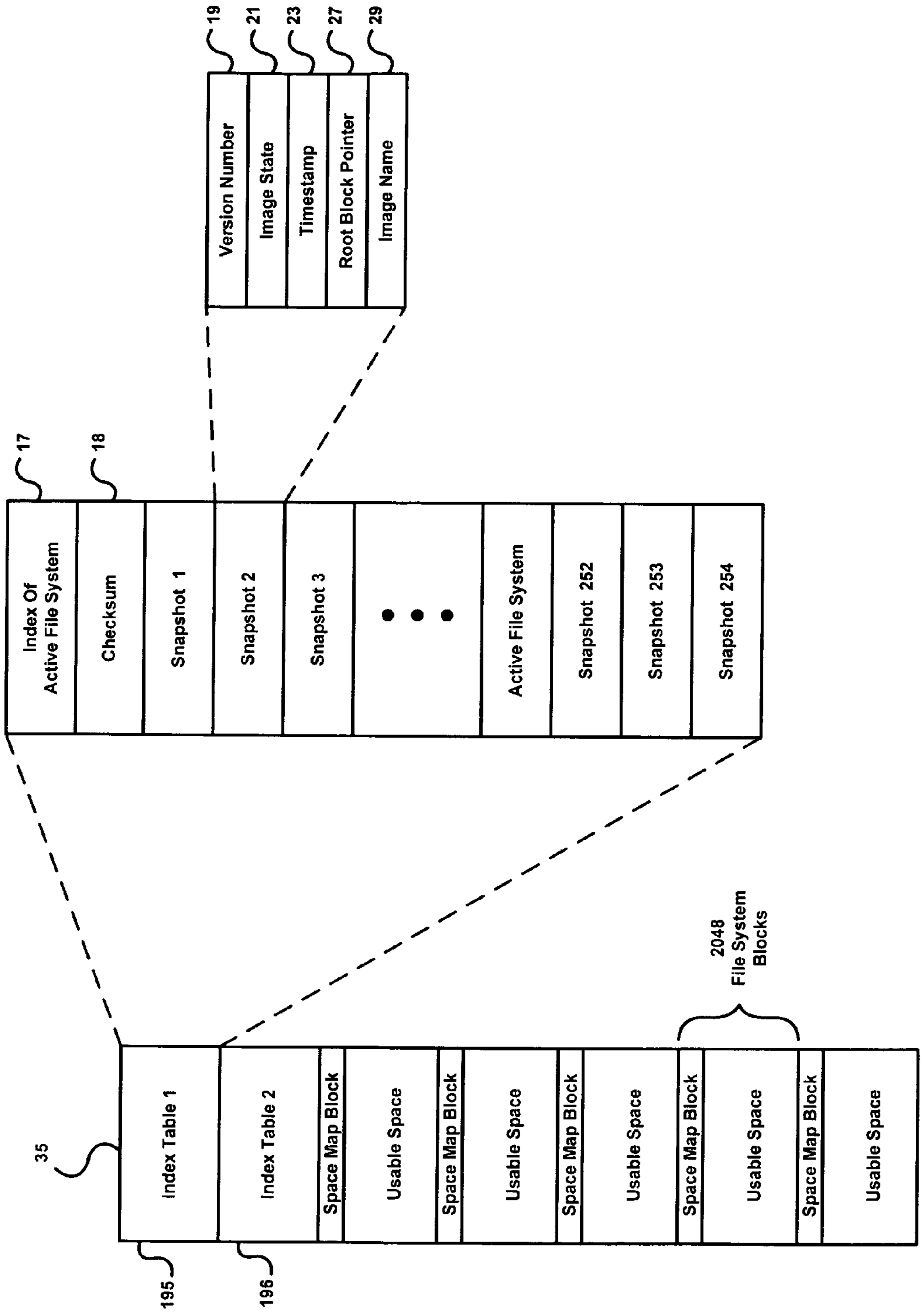
FIG. 3 illustrates details of the virtualized data storage subsystem organized into file system blocks including, snapshot tables, space map blocks, and usable file system data space.

FIG. 3 illustrates a data storage subsystem for maintaining (e.g., allocating, reading, writing, and deallocating) some blocks for index tables, some for space maps, and others for usable space for data storage. The block(s) allocated to an index table depends on the size of each block and the number of concurrent snapshots supported. For example, three 8-KB blocks may be sufficient space to support an index table of 254 snapshots. As shown, the file system has a pair of index tables 195 and 196 and thus uses six 8-KB blocks so the host can alternate writes to the index tables to ensure recovery in case of a data storage system failure. Thus, if the system fails during a write to one index table, the host can retrieve the unmodified copy of the other index table. While we describe this method of writing to alternate index table copies, other methods, such as write journaling, can be used to protect against system failure during index table writes. The remainder of the storage is allocated to space map blocks with usable space for data storage.

Each index table includes an index value of the active file system 17 permitting fast location of the active file system. The index table includes a known algorithm to verify the data integrity such as a checksum 18, a cyclic redundancy check, or a digital signature. The index table provides an index to the snapshots and the active file system. Each entry in the index table represents a snapshot or the active file system. As illustrated, the index range is 1-255, but this range is not essential to the invention. In various embodiments, each snapshot and the active file system has one or more associated attributes such as a version number 19, timestamp 23 and/or image name 29 to identify the snapshot or active file system, an image state 21, a root block pointer 27 as described below.

Each index table includes an index value of the active file system 17 permitting fast location of the active file system. The index table includes a known algorithm to verify the data integrity such as a checksum 18, a cyclic redundancy check, or a digital signature. The index table provides an index to the snapshots and the active file system. Each entry in the index table represents a snapshot or the active file system. As illustrated, the index range is 1-255, but this range is not essential to the invention. In various embodiments, each snapshot and the active file system has one or more associated attributes such as a version number, timestamp and/or image name to identify the snapshot or active file system, an image state, a root block pointer, and an image name as described below.

When the data storage system takes a snapshot of the file system it assigns the snapshot a unique version number such as a 32-bit unsigned integer that increases monotonically for each subsequent snapshot. The version number is not reused even as snapshots are deleted or made obsolete to the file system.

The image state can be one of the following states:

Active—representing the active file system

In-use snapshot—representing a snapshot that users can access

Free—representing available for writing by a snapshot or active file system

Deleted snapshot—representing a user has deleted the associated snapshot but a cleaner process or thread has not yet removed the space map block entry for this snapshot Obsolete snapshot—representing a user has reverted to an earlier snapshot and the cleaner process or thread has not yet removed the space map block entry for this snapshot In an embodiment, when the data storage system takes a snapshot of the file system, the host provides a timestamp (e.g., time and date) when the snapshot or active data image was created. The root block pointer provides the address of the root block in the hierarchical structure of the snapshot and the image name is a character string used to easily identify the snapshot to users.

Figure 4:
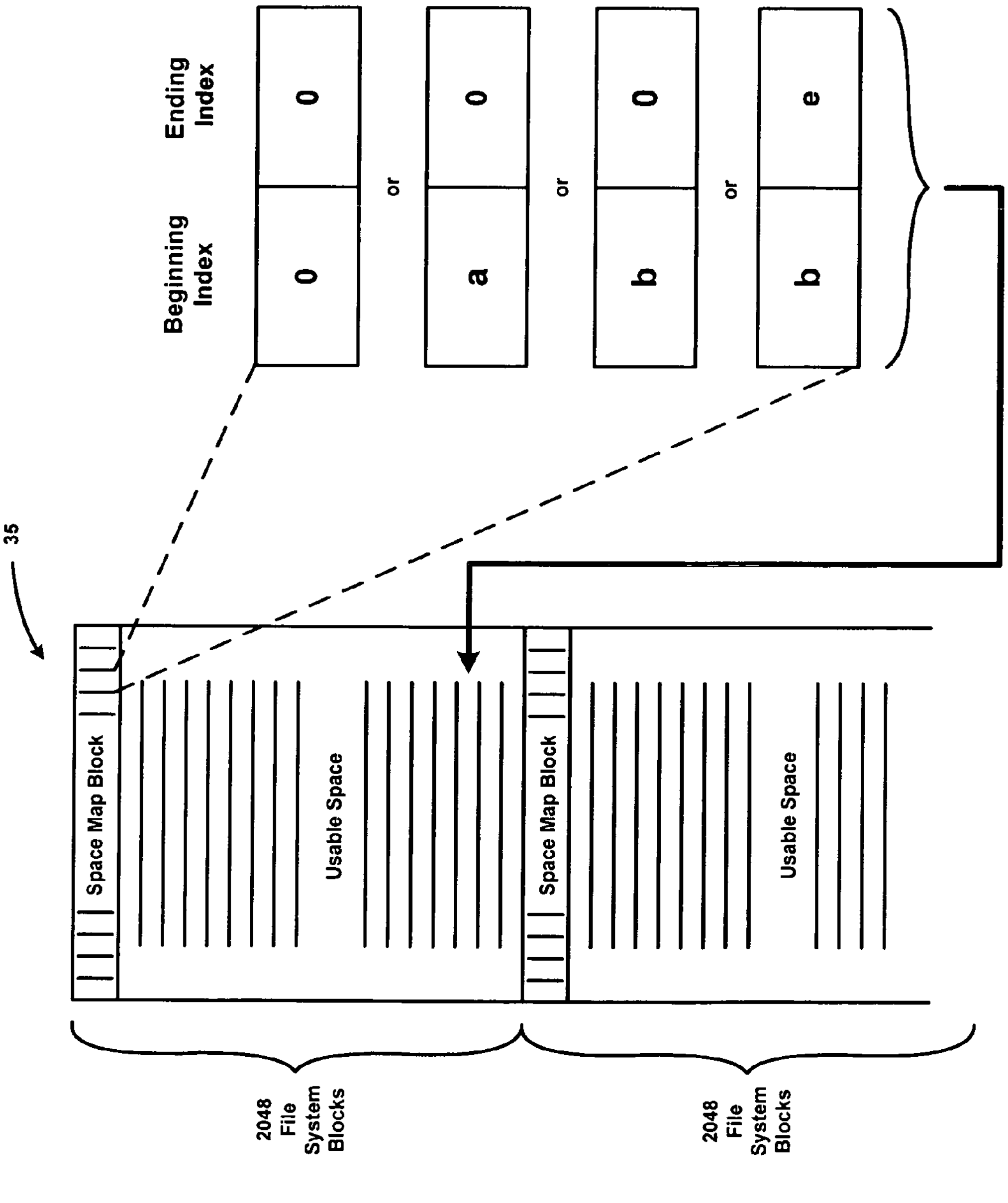
FIG. 4 illustrates details of the space map blocks and a block tracking and index system.

Referring to FIG. 4, the remainder of the data storage subsystem is allocated to space map blocks and usable space for data. Each space map block keeps track of the blocks in its usable space for data storage. For example, a space map block can keep track of 2,047 blocks of usable space. Each space map block entry contains a pair of indexes ("a space map block entry"), for example, 8-bits in length that represent any of 254 snapshots or the active file system. Each space map block entry is an index into the index table shown in FIG. 3. Each space map block entry has a beginning value b that indicates the first snapshot (i.e., snapshot b) and an ending value e that indicates the last snapshot (i.e., snapshot e) to use the associated block. Thus, each space map block entry (b, e) in the space map block is used to track the usage of an associated block in the usable space:

| Beginning Index, b | Ending Index, e | Meaning |
|---|---|---|
| 0 | 0 | The block is free to use by a snapshot or the active file system |
| 8-bit Integer | 0 | The block is in use by one or more snapshots and has not been changed since the first snapshot was taken. The block is also in use by the active file system |
| a | 0 | The block is in use by the active file system only and there are no snapshots associated with the block |
| 8-bit Integer | Another 8-bit Integer | The block is in use by a snapshot and is used by all subsequent snapshots through a last snapshot. The data has changed since the last snapshot was created and is, therefore, no longer in use by the active file system |

In an alternative embodiment, each space map block entry contains a pair of version numbers (e.g., 32-bit) that represent snapshots or the active file system. Thus, each version pair (b, e) in the space map block would be used to track the usage of an associated block in the usable space.

Figure 5:
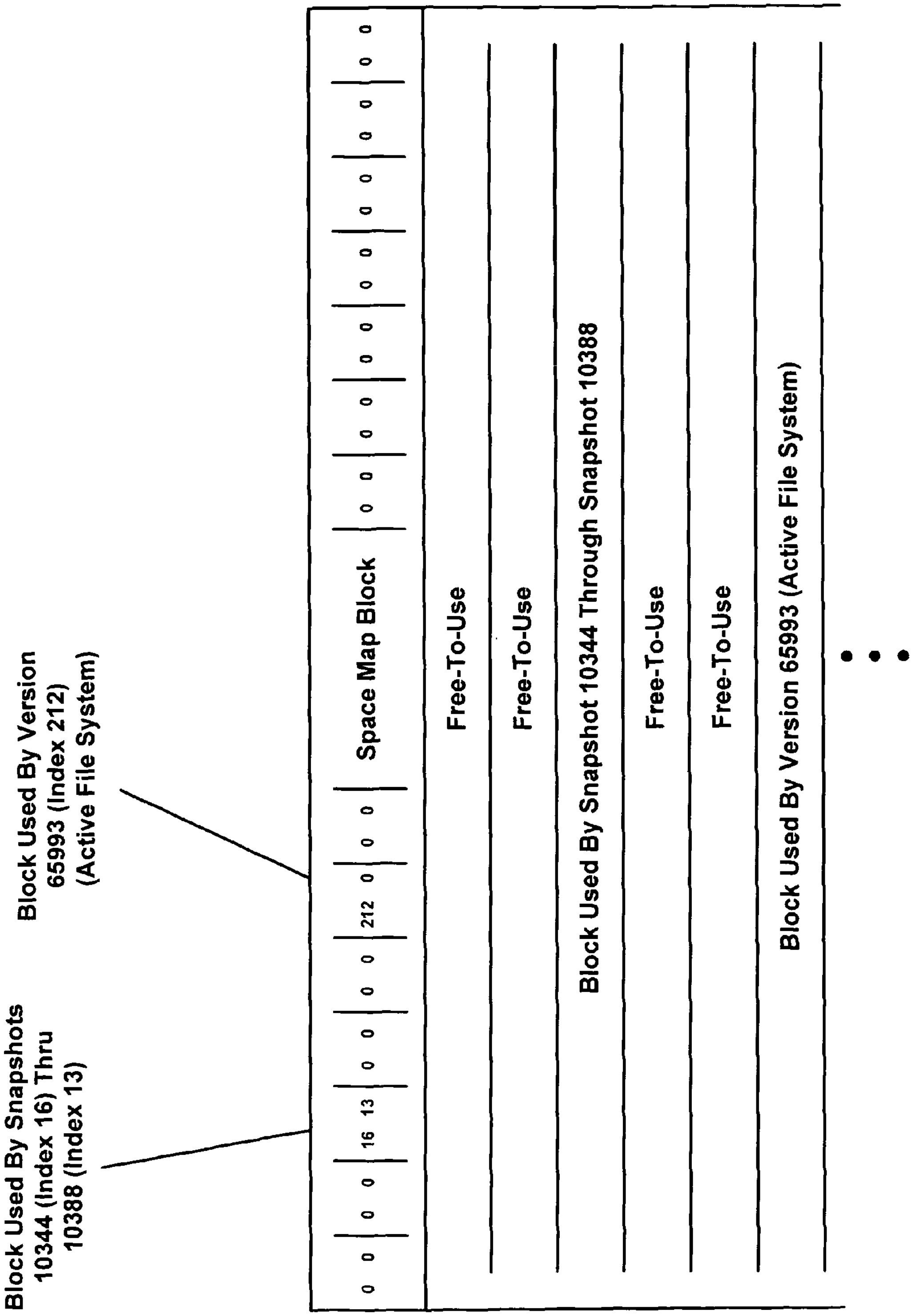
FIG. 5 illustrates examples of a snapshot tracking status in the space map blocks.

FIG. 5 illustrates how a space map block entry is used to track a block in the usable space. In an earlier stage of operation, the space map may contain many entries with beginning and ending values equal to zero indicating that many blocks in the data storage subsystem are free-to-use for snapshots or the active file system. At the same time, other blocks will be in-use that is allocated to snapshots or the active file system. FIG. 5 shows one such block used by snapshots assigned version number 10344 through version number 10388 inclusive. The space map block entry (16, 13) indicates the snapshots that use this block. The host associates the space map block entry with the version number of the snapshot by reading the index table. The space map block also contains space map block entry (212, 0) to show that the active file system, for example, assigned version number 65993 is using an associated block.

Figure 6:
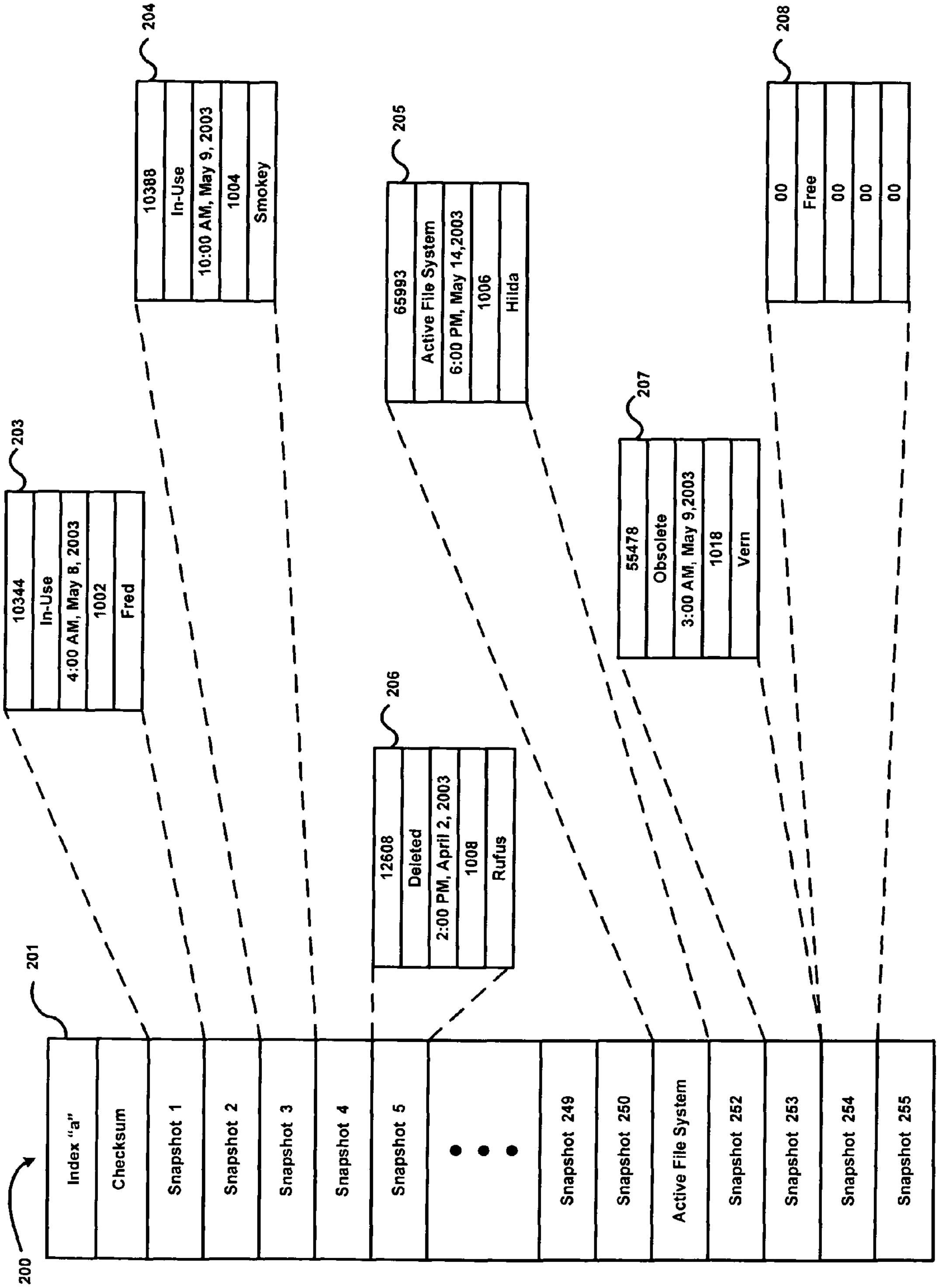
FIG. 6 illustrates details and examples of the snapshot table and snapshot table elements.

FIG. 6 illustrates the relationship between the index table 200 and the snapshot attributes and the active file system attributes. The table below illustrates the group of attributes 203, 204, 205, 206, 207, and 208 that are shown in FIG. 6:

| Index Table Entry | Version Number | Image State | Timestamp | Root block Pointer | Image Name |
|---|---|---|---|---|---|
| Snapshot 1 | 10344 | In-use | 4 AM, May 8, 2003 | 1002 | Fred |
| Snapshot 3 | 10388 | In-use | 10 AM, May 9, 2003 | 1004 | Smokey |
| Active File System | 65993 | Active File System | 6 PM, May 14, 2003 | 1006 | Hilda |
| Snapshot 5 | 12608 | Deleted | 2 PM, Apr. 2, 2003 | 1008 | Rufus |
| Snapshot 253 | 55478 | Obsolete | 3 AM, May 9, 2003 | 1010 | Vern |
| Snapshot 254 | 0 | Free | 0 | 0 | 0 |

Figure 7:
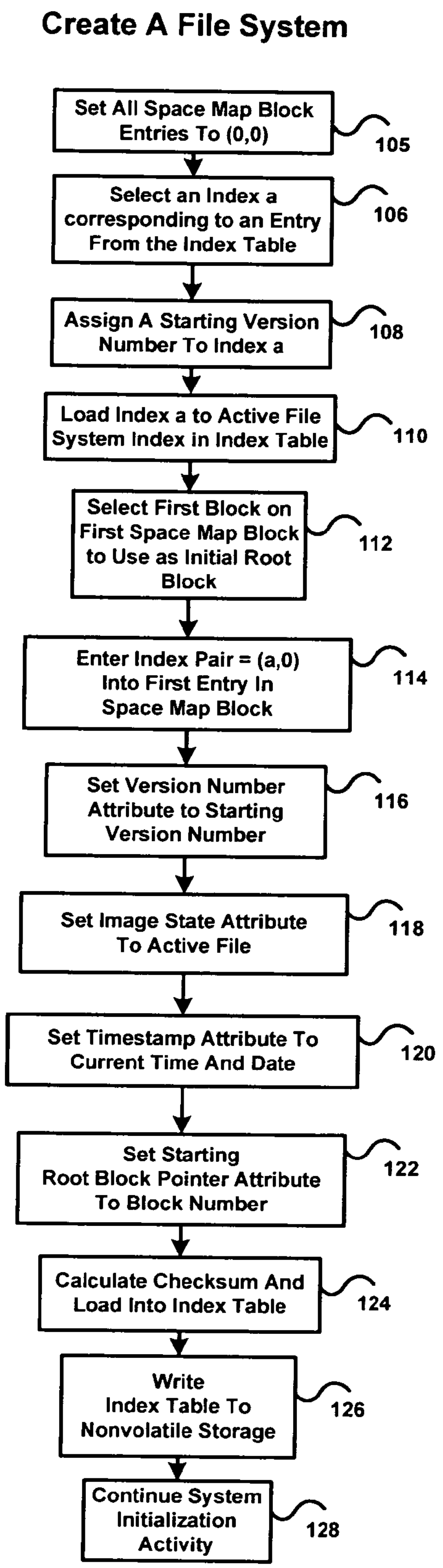
FIG. 7 illustrates a flow diagram for the creation of a file system.

FIG. 7 illustrates a flow diagram of a method for creating a file system. This method can occur during the process of initialization. In an embodiment, the initialization process has proceeded to the point where the next steps relate specifically to file system creation. Although the method is described serially below, the steps can be performed in parallel, for example, asynchronously or in a pipelined manner. There is no requirement the method be performed in the order shown except where indicated. Further, the steps are implemented by computer such as one or more host(s) described earlier. For brevity, we describe the methods as executed by a host.

Referring to step 105 of FIG. 7, the host sets all of the space map block entries equal to (0, 0). This indicates that the blocks corresponding to the entries are free-to-use. At step 106, the host selects an 8-bit index "a" that represents the active file system. At step 108, the host assigns a starting version number to index a. At step 110, the host loads index "a" into the index of the active file system 201 in the directory 200 (FIG. 6). At step 112, the host selects the first available space map block and at step 114 loads the beginning index 8-bit index "a" and an 8-bit ending index 0 into the first entry in the selected space map block. At step 116, the host sets the starting version number in the associated attributes for the active file system in index table entry "a". The host further sets the image state to active at step 118, the timestamp to the current date and time at step 120, and a starting root block pointer at step 122, calls an algorithm to verify the data integrity (e.g., checksum) of the snapshot attributes, and stores the results in index table entry "a" at step 124. At step 126, the host may write the index table to nonvolatile storage. In one embodiment, at step 128, the host continues with any other activities such as initialization. In another embodiment, the other activities can precede the creation of the file system.

Figure 8:
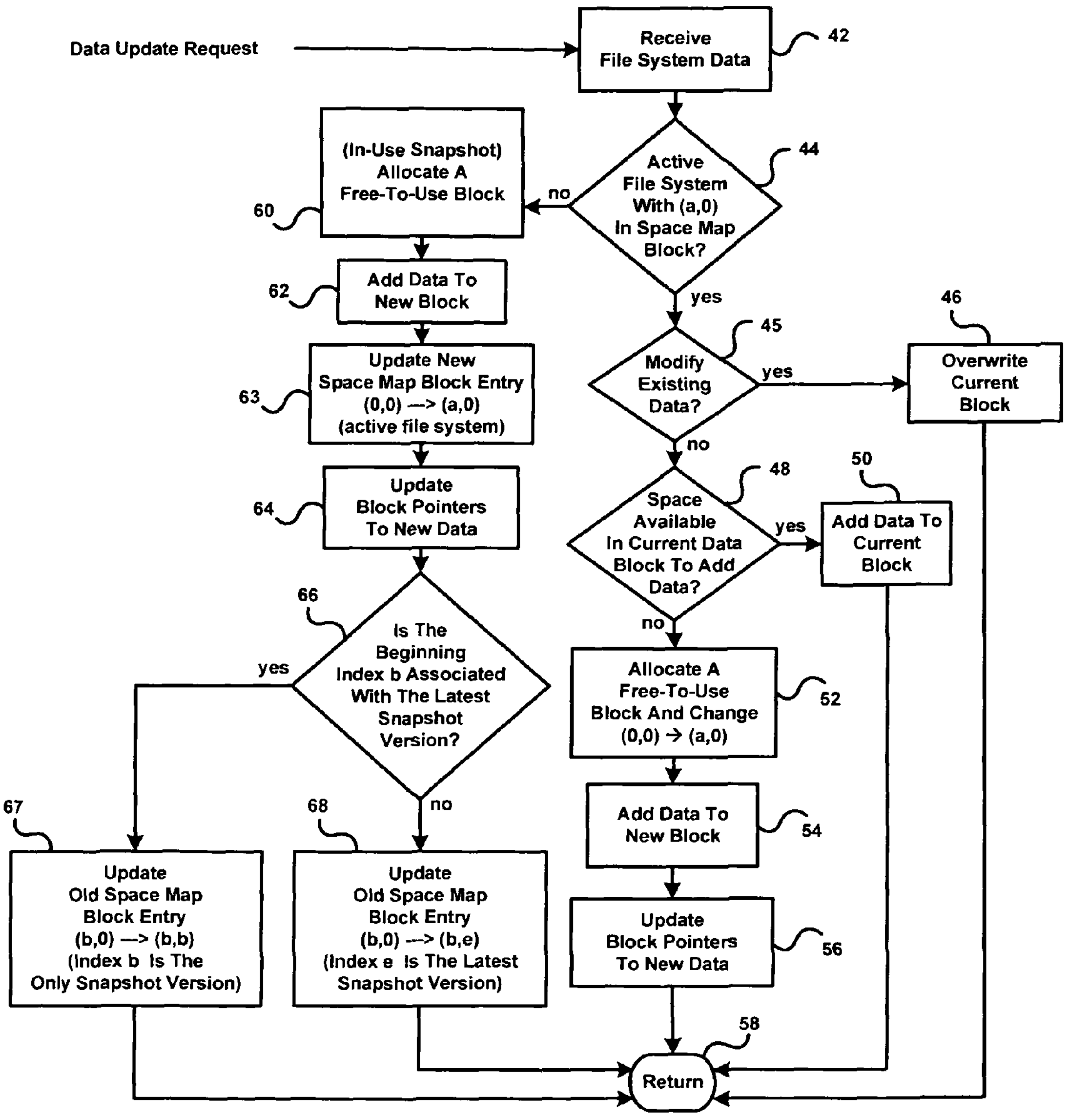
FIG. 8 illustrates a flow diagram for file system block management.

FIG. 8 illustrates a flow diagram of a method of block management. At step 42, the host receives a request to update the file system data. At step 44, the host reads the space map block entry of the associated received data to determine if that block is used by the active file system only. If yes, as indicated by the space map block entry=(a, 0), the host determines at step 45 whether or not the data is a modification of existing data or an addition to existing data. If the received data is a modification of existing data, the host overwrites the block at step 46 and returns to normal operation at step 58. If the received data is an addition to the existing data, the host determines at step 48 if the space available in the current block is enough to hold all of the received data. If yes, the host adds the received data to the current block at step 50 and returns to normal operation at step 58. If not, the host allocates a free-to-use block at step 52 to hold the additional data and changes the associated space map block entry from (0, 0)→(a, 0). At step 54, the host adds the received data to the newly allocated block. At step 56, the host updates the file system block pointers to point to the new data. At step 58, the block management routine returns to normal system operation.

At step 44, if the space map block entry of the block associated with the received data indicates an in-use snapshot uses the block, that is, the space map block entry (b, 0), the host allocates a free-to-use block for the received data at step 60. At step 62, the host adds the received data to the new allocated block. At step 63, the host changes the space map block entry of the new allocated block from (0, 0)→(a, 0) indicating the new block is used by the active file system only. At step 64, the host updates the file system block pointers to point to the new data. At step 66, the host determines if there are other in-use snapshots pointing to the same old block. If the index b is associated with the latest snapshot version number, there is no other in-use snapshots pointing to the same old block. Therefore, at step 67, the host updates the old space map block entry from (b, 0)→(b, b) indicating snapshot b is the only snapshot pointing to the associated old block and that the old data has been modified since snapshot b was created. If the index b is not associated with the latest snapshot version number, there is another in-use snapshot pointing to the same old block. Therefore, at step 68, the host updates the old space map block entry from (b, 0)→(b, e) to indicate that snapshot b is the beginning snapshot and snapshot e is the ending snapshot (i.e., current in-use snapshot with the latest snapshot version number) pointing to the associated old block. In this case, there may be other snapshots with version numbers less than snapshot e and greater than snapshot b pointing to the same old block. In either case, the block management routine returns to normal system operation at step 58.

Figure 9:
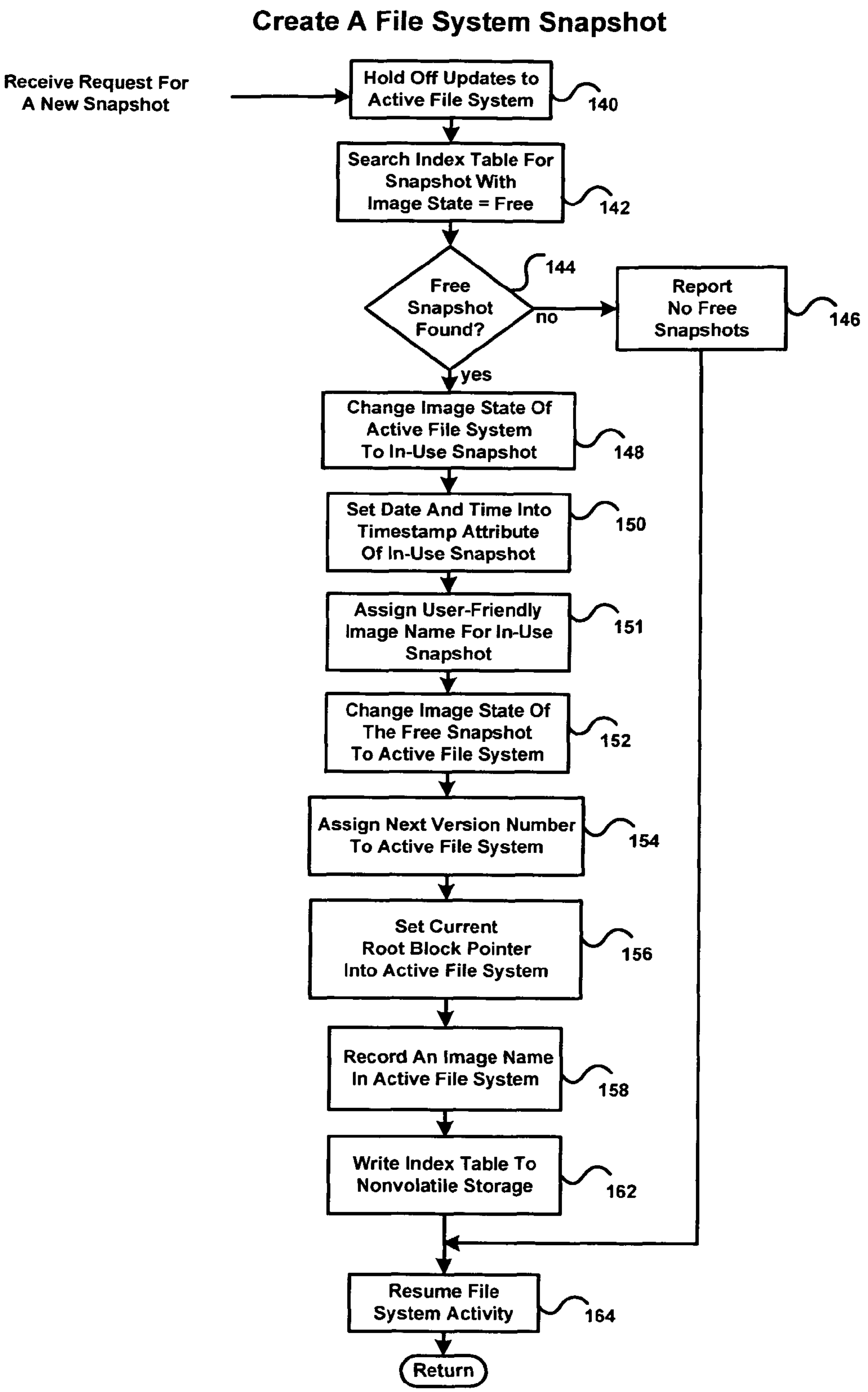
FIG. 9 illustrates a flow diagram for the creation of a file system snapshot.

FIG. 9 illustrates a flow diagram of a method of creating a snapshot. After receiving a request for a new snapshot of the file system, the host holds off from updating the active file system at step 140. At step 142, the host searches through the index table for the first snapshot with an image state equal to free. At step 144, if the host searches the entire index table and does not find a free image state, the routine reports no free snapshots at step 146 and the host resumes normal file system operation at step 164 and if appropriate, the operator can delete some snapshots. If, at step 144, a free image state is found, the host changes the active file system's image state to in-use at step 148. At step 150, the host enters a timestamp of the new in-use snapshot. When this snapshot is created, the version number and the root block pointer remain as they were when the block was allocated to the active file system. At step 151, the host assigns a user-friendly image name for the in-use snapshot. This completes creation of the new snapshot. Next, the host establishes an active file system for normal use. At step 152, the host changes snapshot attributes containing the image state free to the active file system. At step 154, the host assigns the next version number to the new active file system. At step 156, the host enters the current root block pointer (same as the new snapshot) in the attributes of the active file system. At step 158, the host saves a user-friendly image name of the active file system. The snapshot table is written to nonvolatile storage at step 162. The host returns to normal operation at step 164.

Figure 10:
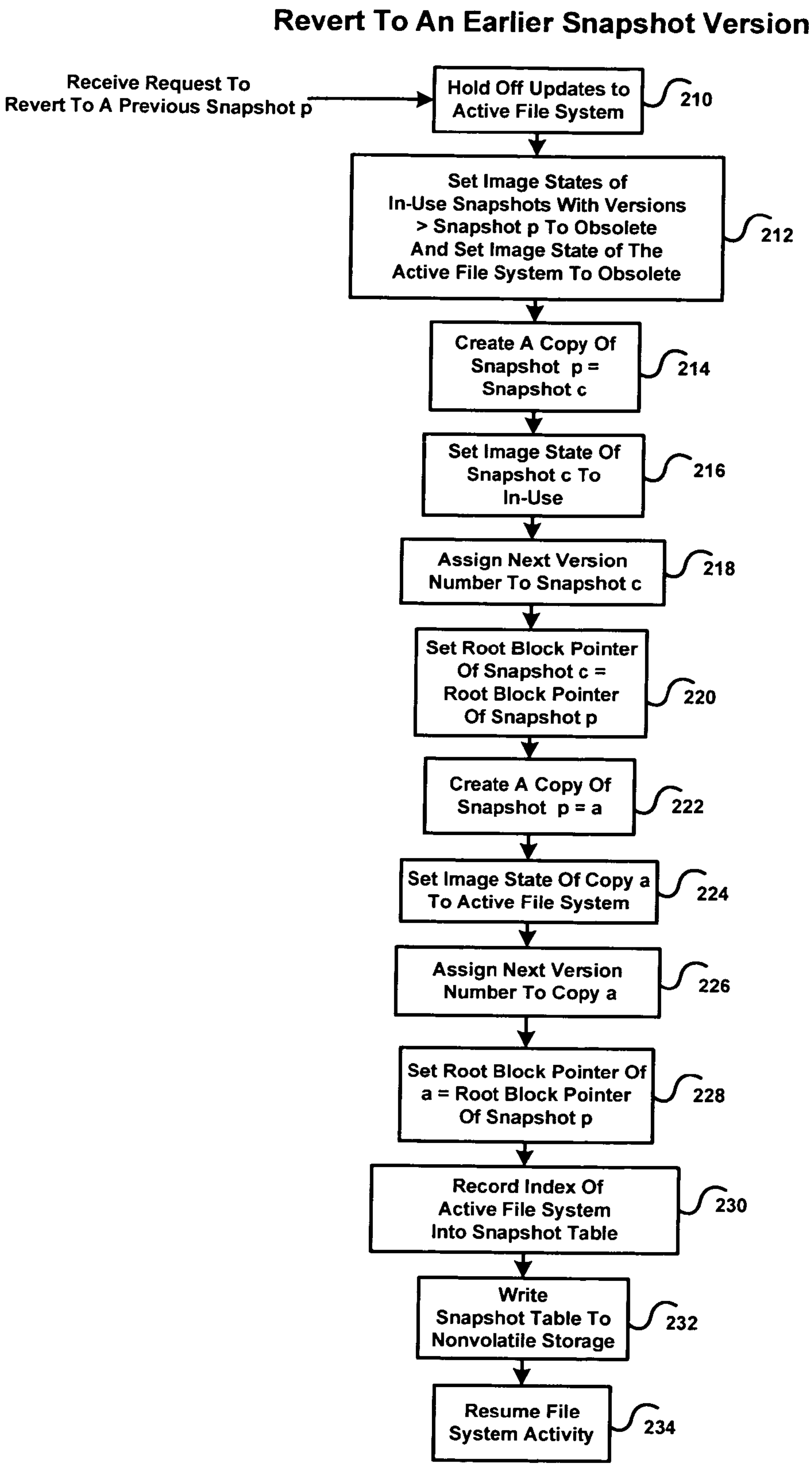
FIG. 10 illustrates a flow diagram of a method to obsolete a file system snapshot.
Figures 15A, 15B, 15C, 15D:
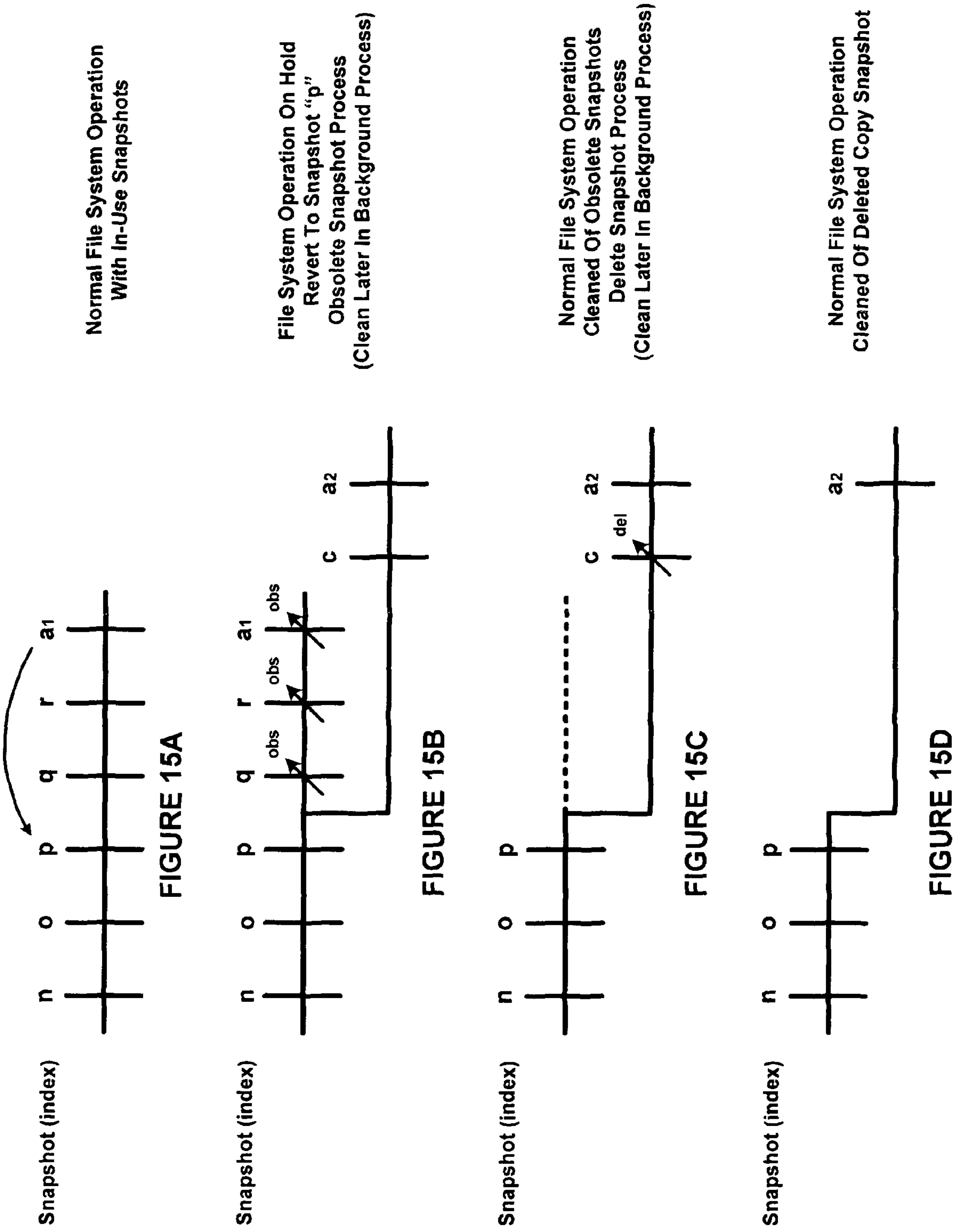
FIG. 15A illustrates a diagram of an active file system with a request to revert to an earlier snapshot.
FIG. 15B illustrates a diagram of an active file system on hold to obsolete snapshots after the earlier snapshot.
FIG. 15C illustrates a diagram of the cleaning of the obsolete snapshots.
FIG. 15D illustrates a diagram of the file system after reversion to the earlier snapshot.

FIG. 10 illustrates a flow diagram for a method used to revert to an earlier version of a snapshot. FIGS. 15A and 15B illustrate diagrams of the method of reversion. At times it is desirable or necessary to revert to an earlier version of the file system. An earlier version of the file system is any previous snapshot of the active file system. Once a previous snapshot is selected, the host discards all versions of the file system after the chosen version, including the current active file system. After receiving a request to revert to the previous snapshot, for example, snapshot p shown in FIG. 15A, the host will hold off updates to the current active file system at step 210. At step 212, the host changes the image state of all snapshots after snapshot p from in-use to obsolete and changes the image state of the active file system from active to obsolete (See FIG. 15B). At step 214, the host makes a copy of snapshot p, for example, called snapshot c. Snapshot c is used to receive any updates to space map block entry (p, 0) that were held off during the process of reverting to the previous snapshot version. This permits snapshot p to be preserved in its present state after the system is brought back to an active image state, while at the same time, not losing the pending updates. At step 216, the host sets the image state of snapshot c to in-use. At step 218, the host assigns the next unused version to snapshot c. At step 220, the host sets the root block pointer of snapshot c to the same root block pointer of snapshot p. At step 222, the host creates another copy of snapshot p, for example, called copy a. The copy a will become the active file system of the desired image of snapshot p. At step 224, the host sets the image state of copy a to the active file system. At step 226, the host assigns the next version number to copy a. At step 228, the host sets the root block pointer of copy a to the same root block pointer of snapshot p. At step 230 the host records index a of the active file system into the index table 200 (FIG. 6). At step 232, the host writes the index table to nonvolatile storage. At step 234, the host returns to normal file system activity.

Figure 11A:
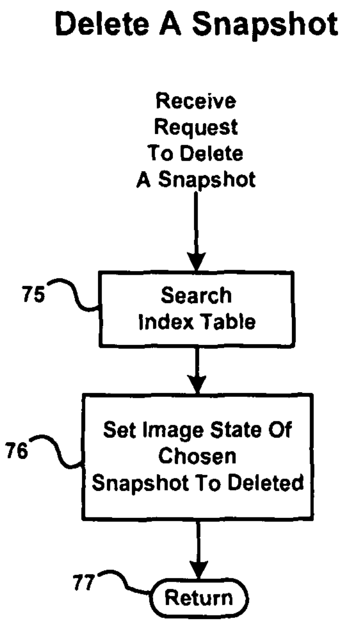
FIG. 11A illustrates a method to delete a snapshot.

FIG. 11A illustrates a flow chart for a method to delete a snapshot. At step 75, after receiving a request to delete a snapshot (see also FIG. 15C) the host searches the index table for the requested snapshot. At step 76, the host sets the image state of the requested snapshot to deleted. At step 77, the host returns to normal file system operation.

Figure 11B:
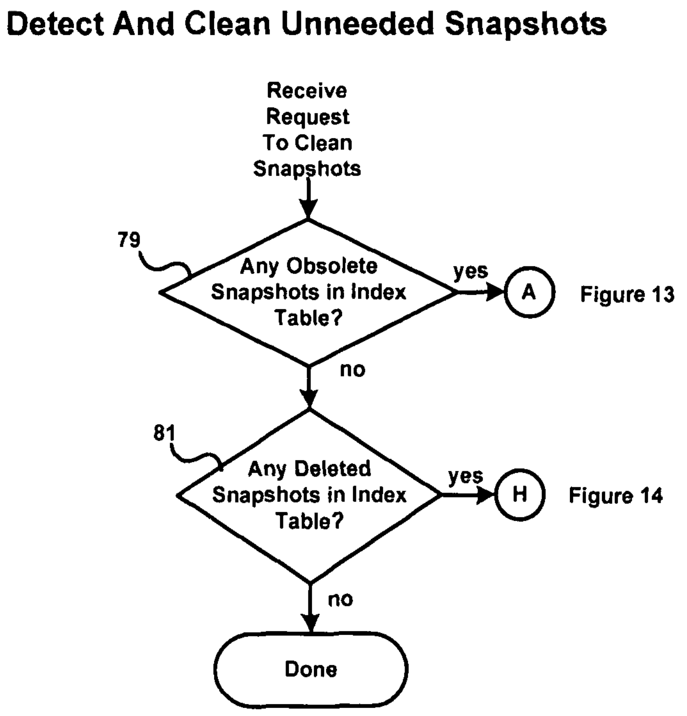
FIG. 11B illustrates a method to detect and clean unneeded snapshots.

FIG. 11B illustrates a high level flow chart for cleaning deleted and obsolete snapshots from the space map blocks and index table of the file system. At step 79, the host determines if any obsolete snapshots exist. If yes, the host goes to reference A in FIG. 13 to clean obsolete snapshots from the space map blocks. If not, the host goes to step 81 and determines if any deleted snapshots exist. If not, then no work needs to be done and the method is complete. At step 81, if a deleted snapshot is found, the host goes to reference H in FIG. 14 to clean deleted snapshots from the space map blocks and index table of the file system.

Figure 13:
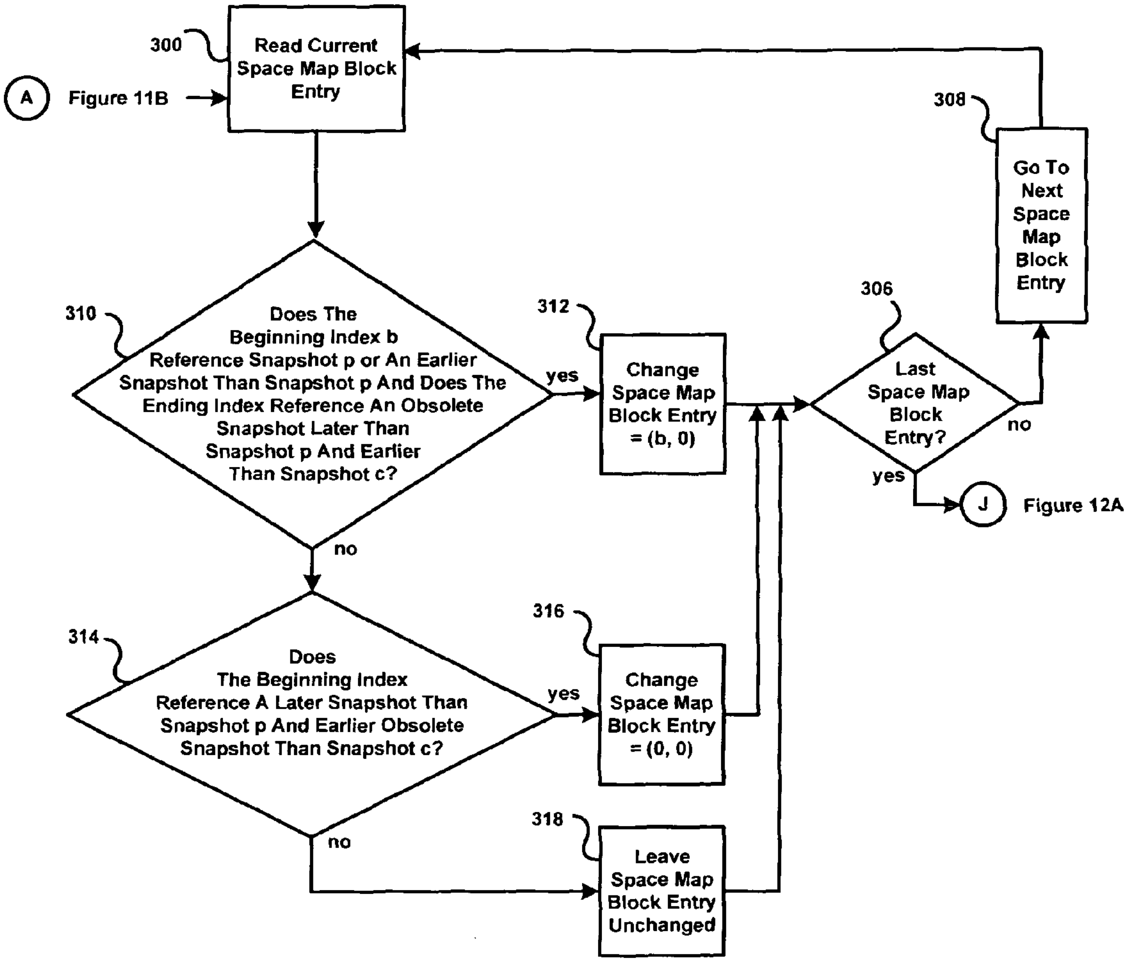
FIG. 13 illustrates a flow diagram of a method to clean obsolete snapshot indexes from space map block entries.

FIG. 13 illustrates the detailed flow chart for cleaning obsolete snapshots from space map block entries after a reversion to snapshot p. Step 300 examines each space map block entry one by one in the file system. Step 310 tests whether the beginning index of the space map block entry either matches the snapshot p to which we reverted or precedes snapshot p while the ending index refers to an obsolete snapshot later than p and earlier than c, the snapshot copy created in step 222 on FIG. 10. If the space map block entry matches these conditions, step 312 changes the space map block entry to (b, 0) to indicate that the block is now in use by the active file system.

If so, step 314 tests if the beginning index of the space map block entry indicates a snapshot later than the reverted-to snapshot p and the ending index indicates an obsolete snapshot earlier than the copy snapshot c. If so, step 316 sets the space map block entry to (0, 0) to indicate that the entry is free-to-use since no snapshot references it. If neither of the conditions tested by steps 310 or 314 are true, then step 318 leaves the space map block entry unchanged.

After executing step 312, 316, or 318, step 306 tests if we have processed the last space map block entry in the file system. If we have processed the last entry, processing continues at Reference J on FIG. 12A to remove the index table entry for all the obsolete snapshots. Otherwise, step 308 moves to the next space map block entry and processing continues at step 300.

Figure 12A:
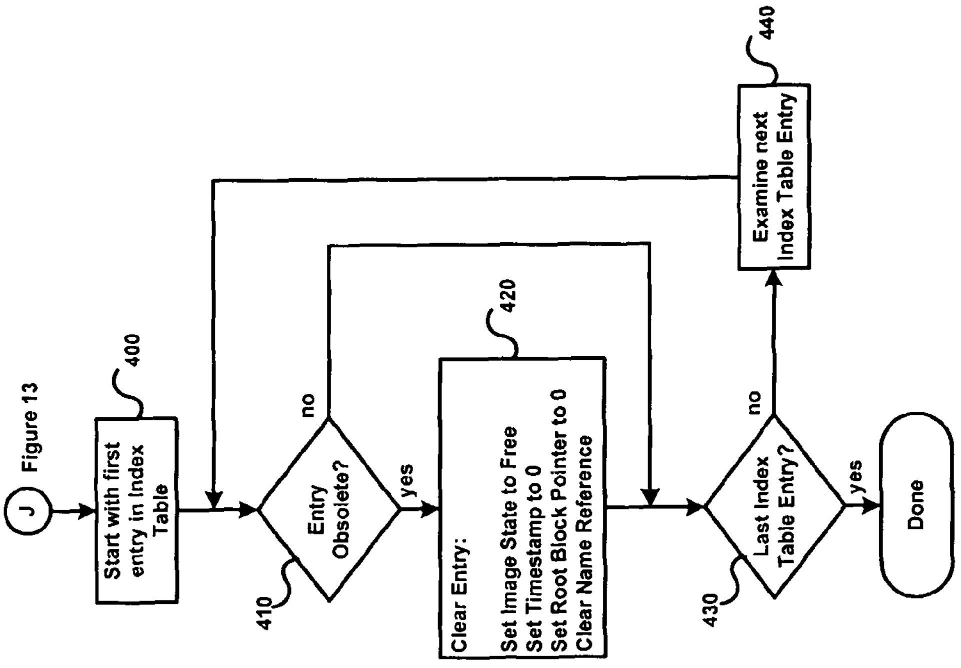
FIG. 12A illustrates a method to remove obsolete snapshots from the index table.

After completing the processing of all obsolete snapshots in the space map blocks, processing continues at Reference J on FIG. 12A to remove the index table entries corresponding to obsolete snapshots. Processing begins at the first index table entry in step 400. Step 410 tests if the index table entry is obsolete. If so, step 420 clears the index table entry by setting the image state to free-to-use, the timestamp to 0, the root block pointer to 0, and by clearing the name reference. Step 430 tests if we have processed the last index table entry. If this is not the last index table entry, step 440 moves to the next index table entry and processing continues at step 410. After all index table entries have been processed, all obsolete snapshots have been completely removed from the file system.

Figure 14:
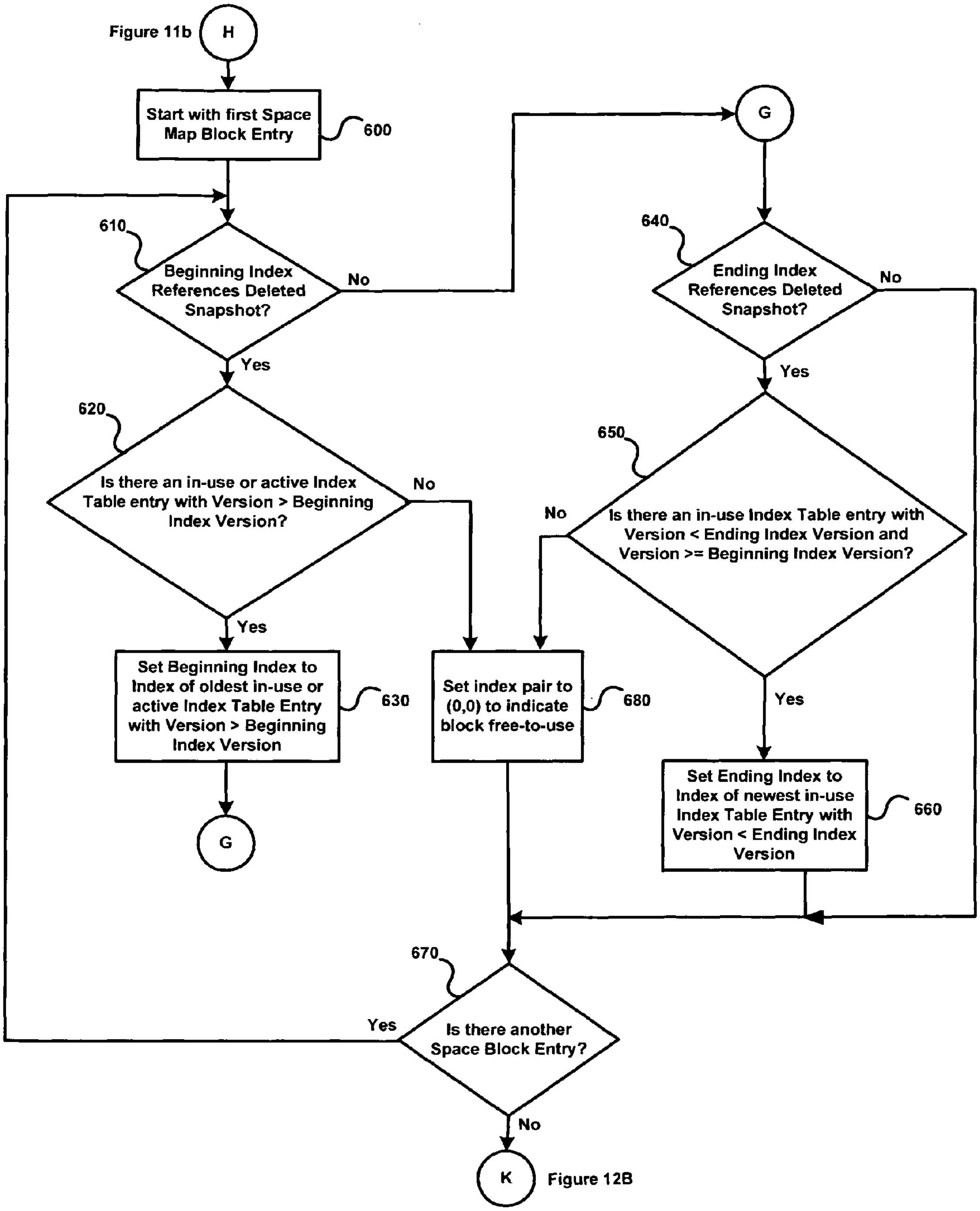
FIG. 14 illustrates a flow diagram of a method to clean deleted snapshot indexes from space map block entries.

Returning to FIG. 11B, if step 81 detects any deleted snapshots in the index table, processing continues at Reference H on FIG. 14. On FIG. 14, step 600 begins with the first space map block entry. Step 610 tests if the beginning index of the space map block entry references a deleted snapshot. If yes, then step 620 tests for any active file system or in-use snapshot with a version later than the beginning space map block entry index. If no snapshot or active file system is found later than the space map block entry beginning index, then step 680 sets the entry to (0, 0) to indicate the corresponding block is free to use. If a later snapshot or active file system is found, step 630 sets the beginning index of the space map block entry to the index of the found snapshot or active file system and continues processing at Reference G on the same sheet.

Step 640 similarly tests the ending index of the space map block entry to see if it references a deleted snapshot. If so, step 650 tests if there is a snapshot with version less than the current ending index and later than or equal to the version of the beginning index. If not, step 680 sets the space map block entry to (0, 0) to indicate that the block is free-to-use. Otherwise, step 660 sets the ending index to the latest in-use snapshot before the current ending index.

Figure 12B:
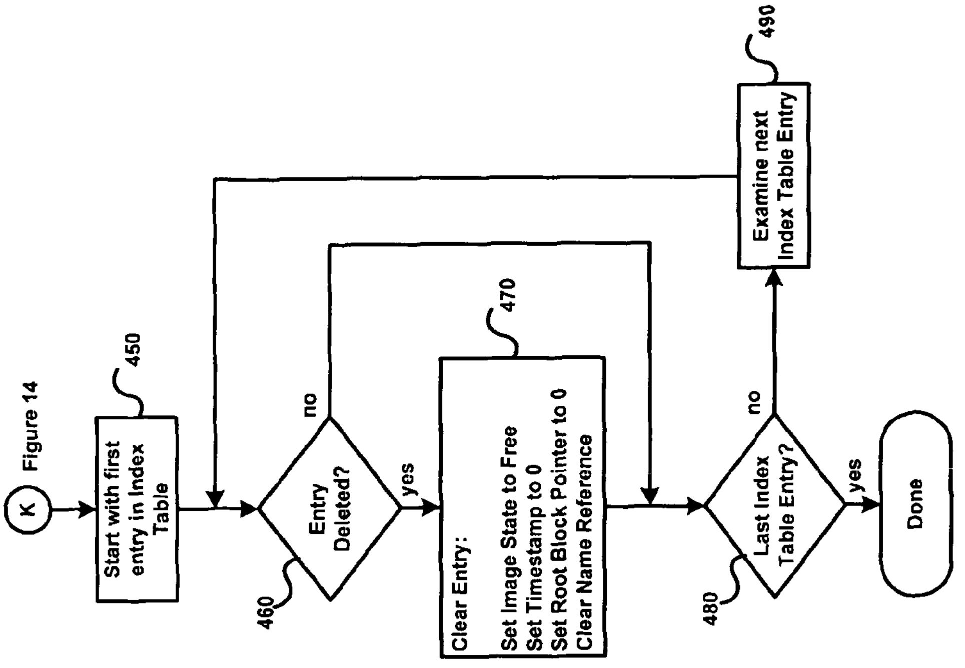
FIG. 12B illustrates a method to remove deleted snapshots from the index table.

After completion of either step 660 or 680, step 670 tests for another space map block entry. If there are more space map block entries to process, control returns to step 610. After all space map block entries have been processed, control resumes at Reference K on FIG. 12B to remove index table entries for deleted snapshots.

Figure 16:
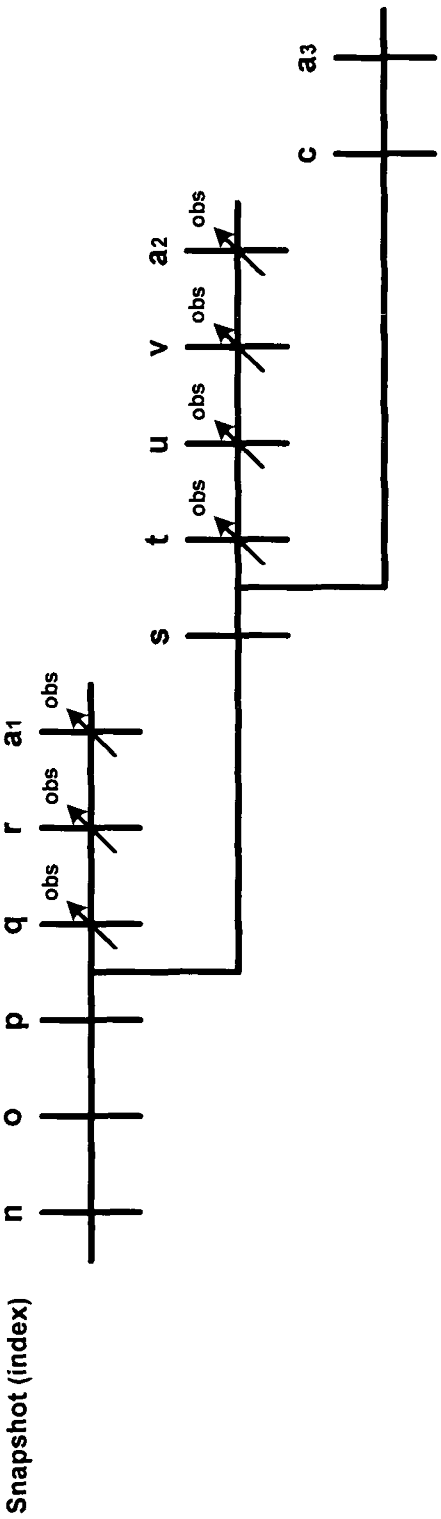
FIG. 16 illustrates a diagram of multiple reversions to earlier snapshots.

FIG. 16 illustrates a diagram of a case where a second reversion to a prior snapshot s has occurred before the background cleaning process for the first reversion to snapshot p has completed. As the file system reverts to a prior snapshot, a pending list is maintained to record the indexes and associated version numbers of the affected snapshots each time the reversion process is invoked. If the file system reverts to more than one snapshot over a span of time where the background cleaning process has not completed, the pending list organizes the cleaning activity by individual reversion event to maintain data reliability of the snapshots. Multiple reversions are likely to occur in large and/or high activity test environments.

At times, a user may want to free storage space in the file system. Because some data may not be deleted without prior consent, a user administering a data storage system may seek a quicker way to get more storage space. For example, the user may be curious how much space will be freed if he deletes older snapshots. However, since the present invention provides snapshots that share blocks and different snapshots share varying amounts of space with each other and with the active file system, it may not be apparent how much space will be freed by deleting a given snapshot.

Figure 17:
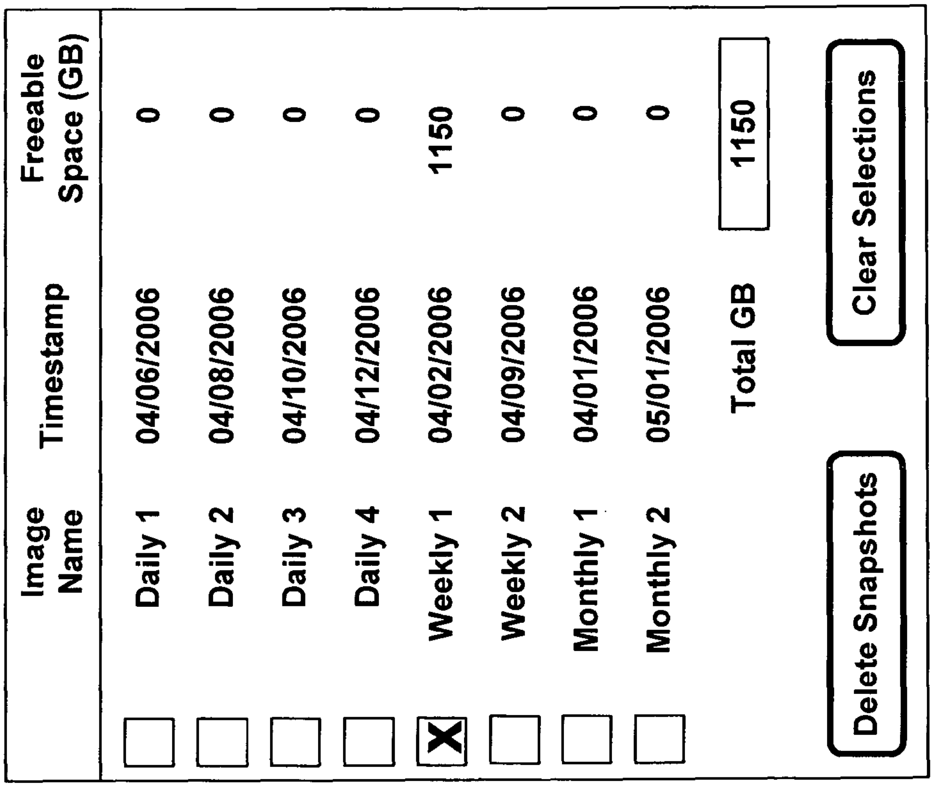
FIG. 17 illustrates an embodiment of a user interface that permits a user to delete certain snapshots to free storage space.

The invention enables a user to determine in advance how much freeable space will be acquired by deleting a given snapshot. FIG. 17 illustrates a user interface for presenting snapshot statistics and assisting in snapshot management that can be run in a management controller of a data storage system such as described in U.S. application Ser. No. 10/837,322, Guided Configuration of Data Storage Systems, filed on Apr. 30, 2004, now U.S. Pat. No. 7,216,192 B2, and in particular, FIGS. 2-3 and accompanying specification, and incorporated by reference herein.

Figure 18:
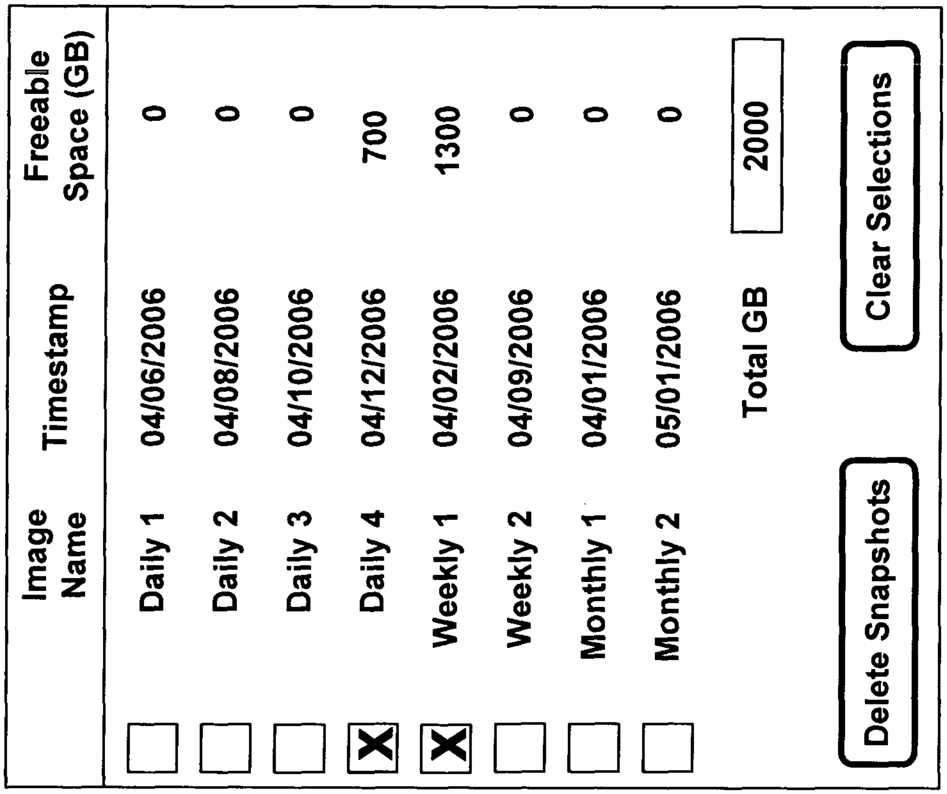
FIG. 18 illustrates an embodiment of the user interface with an additional snapshot selected for deletion.

Referring to FIGS. 17-18, the user interface uses a table to represent a set of snapshots and each of their attributes (e.g., image name, timestamp and freeable space) and select one or more snapshots for deletion. Below this table are graphical elements to actually delete the selected snapshots. The total field keeps a running tally of the total freeable space in GB that will be obtained if the selected snapshot(s) are deleted.

FIG. 17 illustrates the user interface as displaying a set of snapshots (e.g., eight snapshots) taken over a time period (e.g., several weeks). Once the user selects a first snapshot for deletion, the user interface presents a first value of freeable space. As shown, if the user marks the check box adjacent the snapshot with an image name of weekly 1 and a timestamp of Apr. 2, 2006, the user interface presents a value of freeable space, e.g., 1150 GB. The user can delete the first snapshot by interacting with another graphical element (e.g., delete snapshots) and the freeable space, e.g., 1150 GB, is released to the free memory in the file system.

If the user decides instead he wants to start all over again in selecting snapshots for deletion without leaving the user interface for snapshot management, he can interface with another graphical element (e.g., clear selections) and all snapshot selections will be cleared (e.g., marks in the checkbox erased).

FIG. 18 illustrates the user interface, prior to deletion of the first snapshot selected, after the user selects a second snapshot with an image name of daily 4 and a timestamp of Apr. 12, 2006. Now the freeable space shows a second value of freeable space, e.g., 700 GB. In our example, the freeable space of the first snapshot also increases (e.g., from 1150 to 1300) since the first and second snapshot share an additional 150 data blocks. Finally, the user interface presents the total freeable space, e.g., 2000 GB, that will result once the first and second snapshots are actually deleted.

After all selections are made as illustrated by the two snapshots in FIG. 18, the user will make his final decision on whether the value of keeping the snapshots is less than the benefit of freeing up that amount of storage space. If so, the user executes his final decision by interacting with the graphical element (e.g., delete snapshots). This two-step selection and deletion process enables the user to see the freeable space associated with any combination of snapshots before deletion and reduces the chance of unintentional deletions. Again, if the user wants to clear the selections, prior to deletion, he can select the clear selections button or select exit to leave this user interface (not shown). In alternative various embodiments, the user interface can present the same information and choices as just explained in a menu-based or command based interface.

To present this information in the user interface, the file system maintains the snapshot space statistics in the following manner. The file system will scan all the space map blocks at time intervals and count the number of each type of space map block entry in the space map blocks. Because space map block entries serve as an index to a block in user data space, the blocks can be related to each snapshot. In an embodiment, the invention stores the free space information after a scan (e.g., a scan to free blocks from deleted or obsolete snapshots) and keeps the free space information up to date during operation and with creation and deletion of snapshots.

To keep track of the blocks associated with each snapshot, the file system provides a data structure referred to as snapspace matrix or simply snapspace.

Figure 19:
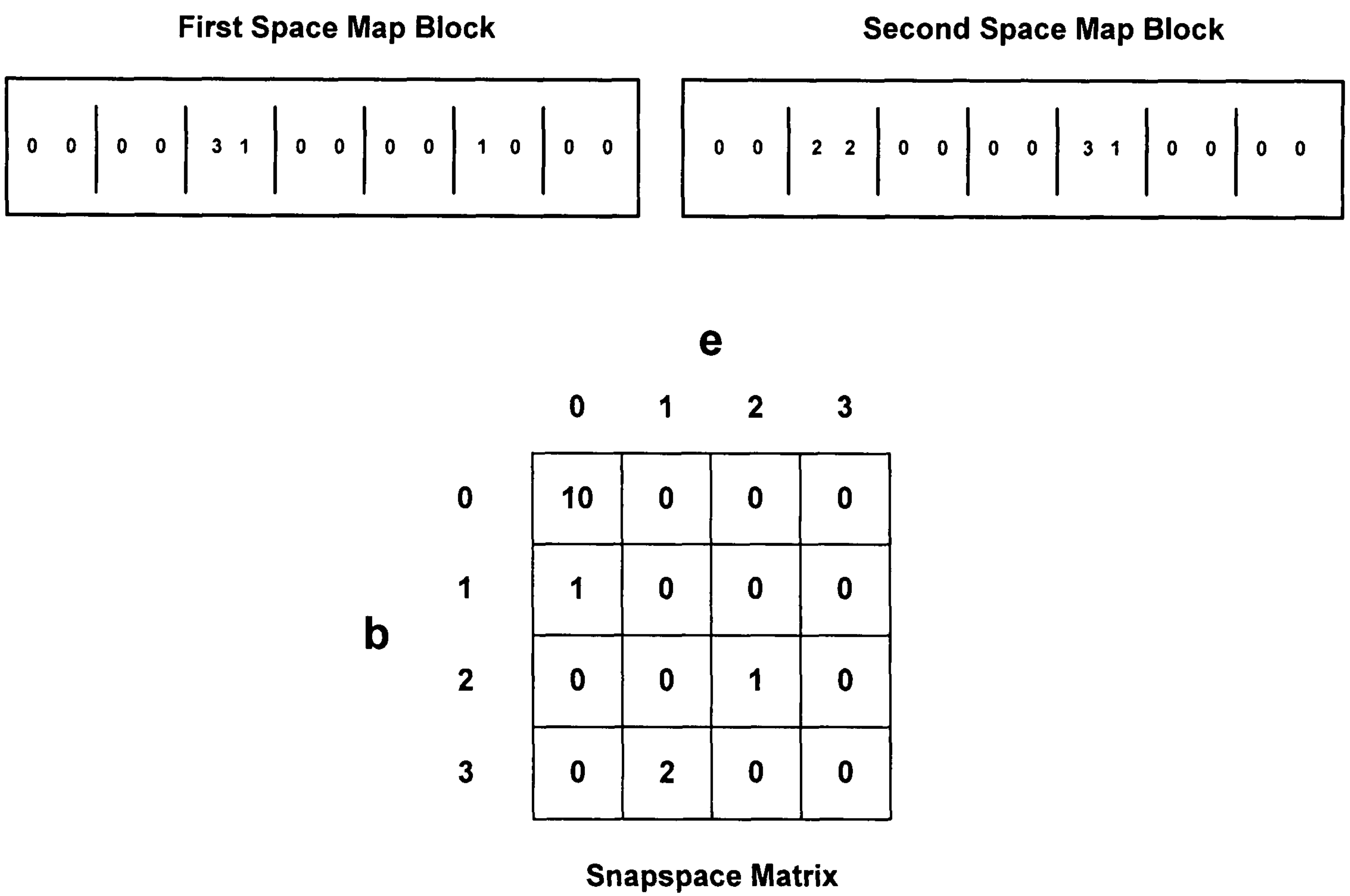
FIG. 19 illustrates the snapspace matrix and values of each index entry [b, e].

FIG. 19 illustrates a small snapspace matrix that is a two-dimensional array in the file system and indexed by beginning and ending (b, e) snapshot indexes in space map blocks. The size of the snapspace matrix corresponds to the number of snapshots to be taken, and can be static or dynamic at run time. The number of space map blocks and their size depends on the relative allocation between the usable data space and the space map blocks and the overall size of the file system as shown in FIG. 4.

As shown in FIG. 19, each element of the snapspace matrix contains the number of index entries found in the space map blocks. If each space map block entry points to one block in usable data space (see FIG. 4), each element also contains the number of blocks associated with that index entry (b, e). For example, the first and second space map blocks each contain five index entries (0,0), representing free blocks, so element [0,0] of the snapspace matrix contains 10. Further, the first and second space map blocks each contain an index entry (3,1) so element [3,1] of the snapspace matrix contains 2 blocks. The first space map block contains an index entry (1,0), representing the active file system, so element [1,0] of the snapspace matrix contains 1 block, while the second space map block contains an index entry (2,2), so element [2,2] of the snapspace matrix contains 1 block. Because the number of space map block entries corresponds to the number of blocks in the file system having a given index entry, a 64-bit counters should be more than adequate in many situations to keep track of the number of index entries contained in each element of the snapspace matrix.

Figure 20A:
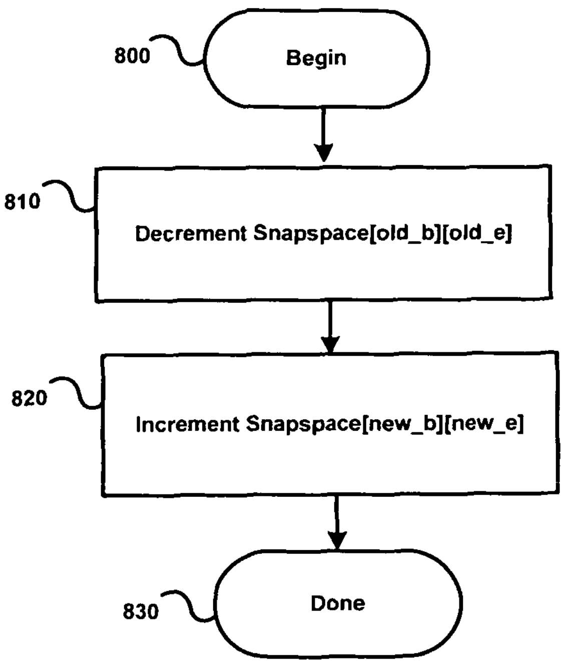
FIGS. 20A-20B illustrate file system updates to the snapspace matrix.
Figure 20B:
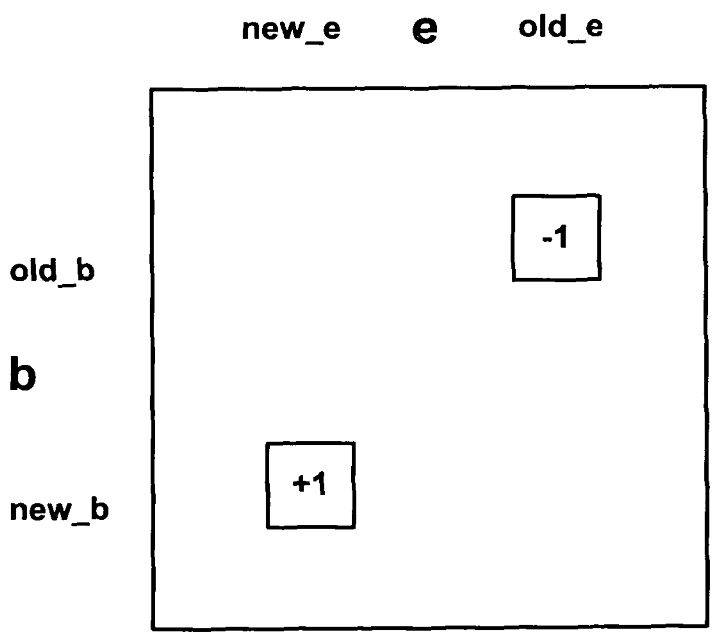

Operations that scan and update the space map blocks to remove deleted and obsolete snapshots update the snapspace matrix as described earlier for normal operations. As shown in FIG. 20A, during operation on space map block p, the file system updates the snapspace matrix beginning at step 800. If a normal operation changes a space map block entry from (old_b, old_e) to (new_b, new_e), the file system updates the snapspace matrix by decrementing snapspace [old_b, old_e] at step 810 and incrementing snapspace [new_b, new_e] at step 820. At step 830, the method of update is done. This value swap also illustrated in FIG. 20B entails the total value of all of the elements of the snapspace matrix remains constant which is to be expected given a file system has a predetermined size.

File system utilities can use the snapspace matrix to determine the number of blocks a user will free by deleting a snapshot. In one case, snapspace [s,s] indicates the number of blocks that deleting snapshot s will free. As the user considers the deletion of more snapshots, the file system takes into account the cumulative effect of deleting a set of snapshots. An embodiment can simply copy the snapspace matrix and update the copy accordingly as the user considers deleting various snapshots.

In another aspect, the invention provides a snapspace matrix that reduces the required memory needed to hold the elements of snapspace matrix updated during normal operations. During normal operation with active index a and the most recent snapshot having index r, the file system changes the space map block entries to (b, r) and allocates new space with entries of the form (a, 0). If we arrange snapspace by columns and put snapspace [b, e] adjacent to snapspace [b+1, e] then we need to keep in memory only 2×256×8 bytes or 4,096 bytes.

Figure 21:
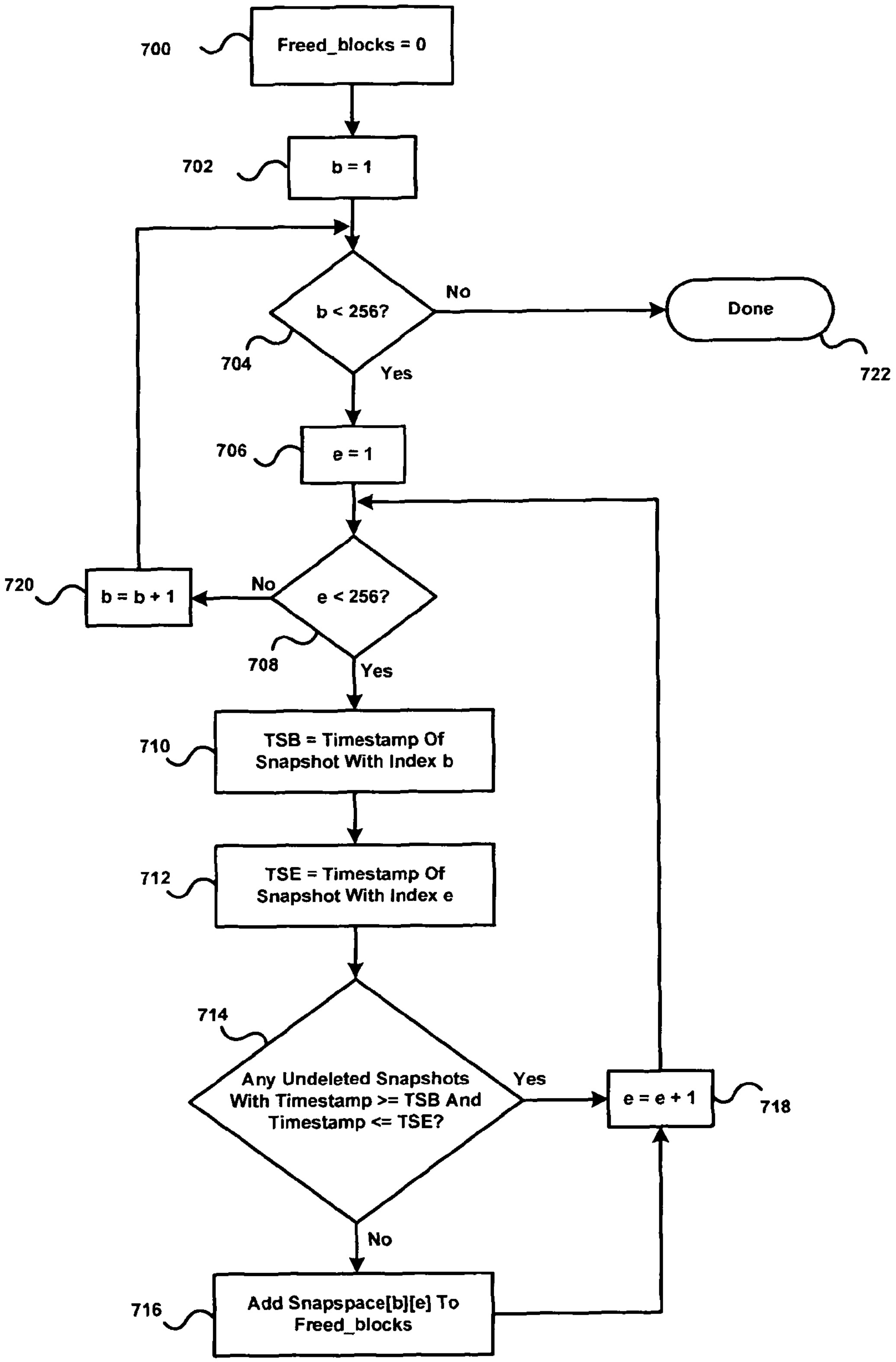
FIG. 21 illustrates a method for calculating the free space available after deleting one or more snapshots.

FIG. 21 shows a flowchart of a method for calculating the amount of free space available after deleting one or more snapshots. At step 700, the method initializes the variable Freed_blocks to zero. Freed_blocks will accumulate the number of blocks available in deleted snapshots. At step 702, the method initializes the variable b to 1. The variable b indicates the beginning snapshot index under current consideration; no space map block entry representing allocated space has a beginning index of 0, so the method starts with 1. At step 704, the method compares b to see if the maximum value of 256 has been reached. If so, the method terminates at step 722 with Freed_blocks containing the total number of blocks available in deleted snapshots. At step 706, the method initializes the variable e to 1; e indicates the ending snapshot index under consideration. Since no space map block entries representing space that can be freed end in 0, the method begins with the value of 1. At step 708, the method compares e to the maximum value; if e has reached this value, the method increments b at step 720 and resumes execution at step 704. At step 710, the method determines the value TSB representing the timestamp of the snapshot index b. At step 712, the method determines the value TSE representing the timestamp of snapshot index e. At step 714, the method tests for any undeleted snapshots with a timestamp between TSB and TSE, inclusive. If there are any such snapshots, then the file system still needs to retain blocks represented by space map block entry (b, e), so the method increments e to the next value at step 718 and resumes execution at step 708. At step 716, the method has determined no snapshots still need to retain blocks represented by space map block entry (b, e), so the method adds Snapspace[b][e] to Freed_blocks, then continues execution at step 718.

In an embodiment, an array is prepared in advance that contains the timestamps of undeleted snapshots sorted in ascending order. The search for undeleted snapshots with a timestamp between TSB and TSE at step 714 is performed by a binary search of the array of timestamps for any timestamp at least as large as TSB and no larger than TSE.

While the method of FIG. 21 determines the space allocated to deleted snapshots, it can be modified to determine the space allocated by a set of snapshots proposed to be deleted by changing the test at step 714 to test for any snapshots not in the proposed list with timestamps between TSB and TSE.

An enterprise may want to protect data contained in its file system by storing a remote copy of the file system off-site if the primary data storage system fails or in the event of a local disaster. Data replication can provide this protection by transmitting the primary file system over a network to a secondary data storage system.

The primary data storage system's file system is actively modified. The primary data storage maintains a base snapshot of the active file system that represents the contents of the file system of the secondary data storage system. To bring the secondary file system up-to-date after modifications to the blocks of the primary file system, the primary data storage system will periodically (e.g., hourly or daily or weekly) take a delta snapshot, examine the space map block entries of the file system to identify the modified blocks between the base snapshot and the delta snapshot, and transmit the modified blocks from the primary data storage system to the secondary data storage system.

An enterprise may also protect data in its file system by only backing up the blocks that have been modified since the last back up. The invention provides an efficient way to find the modified blocks.

FIGS. **22*a* through 22*g*** shows the relationship between a block that has an associated space map block entry (b, e) and a base snapshot and a delta snapshot. These relationships explain whether the block has been modified after the base snapshot and is still in use in the delta snapshot and therefore contains new or modified information associated with the delta snapshot.

Figures 22A, 22B, 22C, 22D, 22E, 22F, 22G:
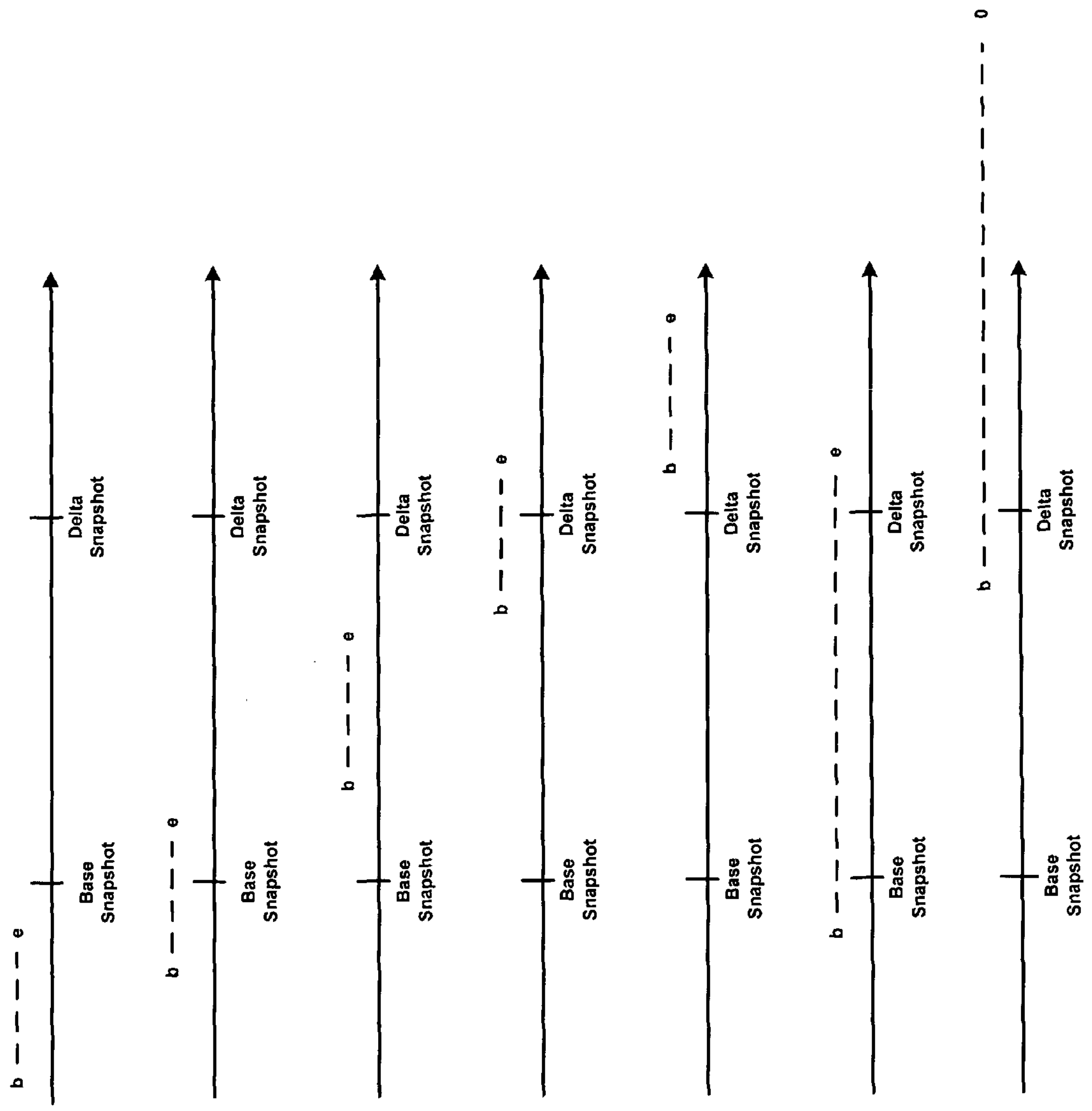
FIGS. 22A-22G illustrate block modifications with respect to a base snapshot and a delta snapshot.

In FIG. 22A, the space map block entry describes a block allocated and freed before the base snapshot. Therefore, the block was not modified after the base snapshot and is not associated with the delta snapshot.

In FIG. 22B, the space map block entry describes a block allocated before the base snapshot and freed before the delta snapshot. While the block transitions from being allocated to not being allocated between the base snapshot and the delta snapshot, the data on the block is not modified.

In FIG. 22C, the space map block entry describes a block allocated after the base snapshot and freed before the delta snapshot. Therefore, the block does not contain data that changed since the base snapshot and is still allocated after the delta snapshot.

In FIG. 22D, the space map block entry describes a block allocated after the base snapshot and freed after the delta snapshot. Therefore, the block was modified after the base snapshot and is still allocated after the delta snapshot. The block is modified between the base snapshot and the delta snapshot.

In FIG. 22E, the block is allocated and freed after the delta snapshot. Therefore, the block is not modified between the base snapshot and the delta snapshot.

In FIG. 22F, the block is allocated before the base snapshot and freed after the delta snapshot. Therefore, the block is not modified between the base snapshot and the delta snapshot.

In FIG. 22G, the space map block entry describes a block allocated after the base snapshot that remains active (i.e., as indicated by the last entry being "0") after the delta snapshot. Therefore, the block was modified after the base snapshot and is still allocated after the delta snapshot. The block is modified between the base snapshot and the delta snapshot.

Figure 23:
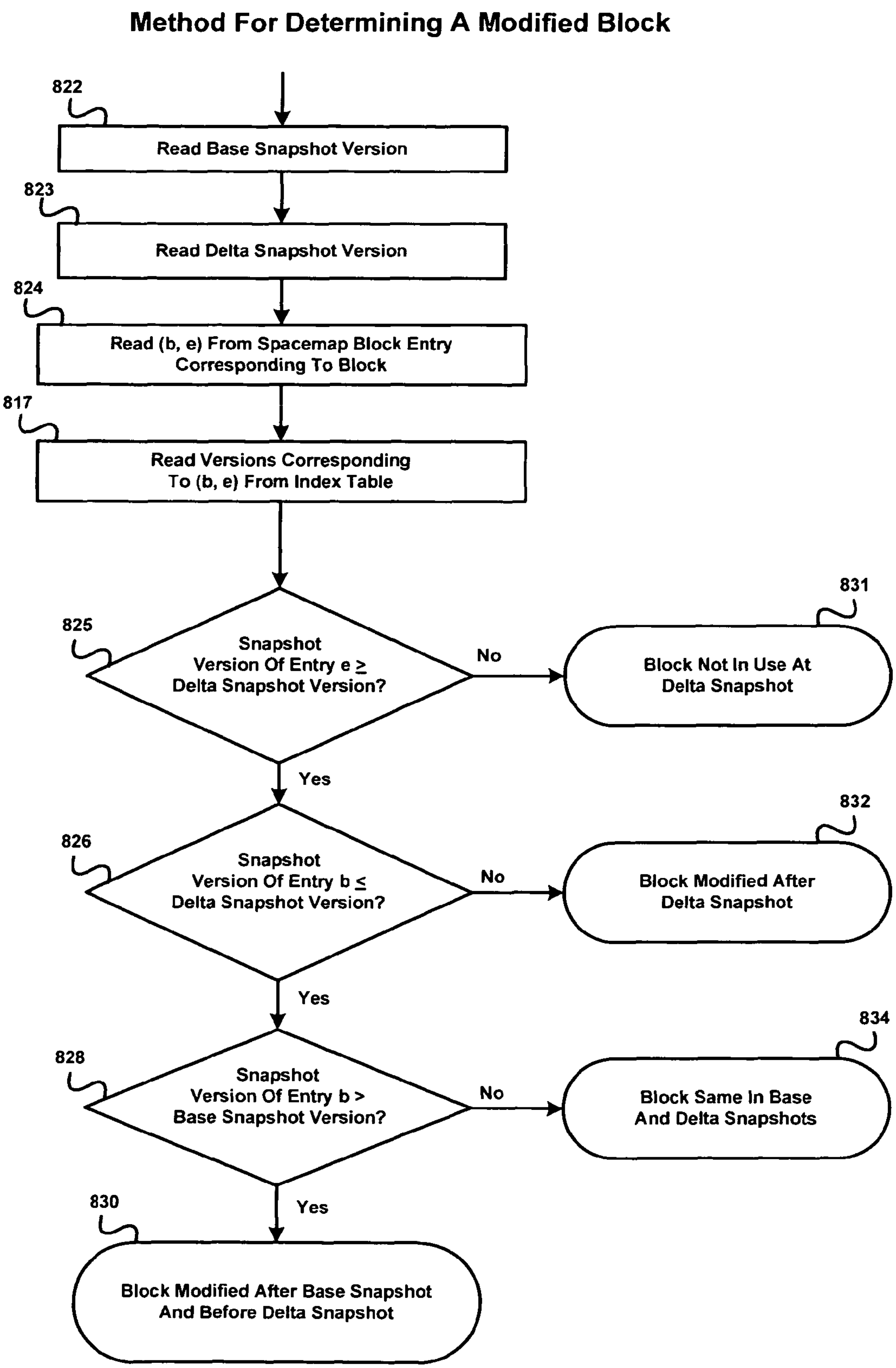
FIG. 23 is a flow diagram illustrating a method for determining if a block has been modified with respect to a base snapshot and a delta snapshot.

FIG. 23 shows a method implemented in a software program and executed in a host (FIG. 1) that determines whether a block is modified after a base snapshot and before a delta snapshot. At step 822, the method reads the base snapshot version (e.g., time stamp or version number). At step 823, the method reads the delta snapshot version (e.g., time stamp or version number). At step 824, the method reads (b, e) from the space map block entry corresponding to the block. At step 820, the method reads versions corresponding to (b, e) from the index table. At step 825, the method tests if the snapshot version corresponding to entry e is greater than or equal to the delta snapshot version. If not, the method indicates that the block is not in use at the delta snapshot (see FIGS. 22*a*, 22*b*, and 22*c*) and terminates at step 831.

If the snapshot version corresponding to the entry e is greater than or equal to the delta snapshot version at step 825, the method tests if the snapshot version corresponding to the entry b is less than or equal to the delta snapshot version at step 826. If not, the method determines that the block was modified after the delta snapshot (see FIG. 22E) and terminates at step 832. If so, the method tests if the snapshot version corresponding to the index b is greater than the base snapshot version at step 828. If not, the method determines that the block is the same in the base snapshot and the delta snapshot (see FIG. 220 and terminates at step 834. If so, the method determines that the block was modified after the base snapshot and is still allocated to the delta snapshot (see FIGS. 22*d* and 22*g*) and terminates at step 830.

Figure 24:
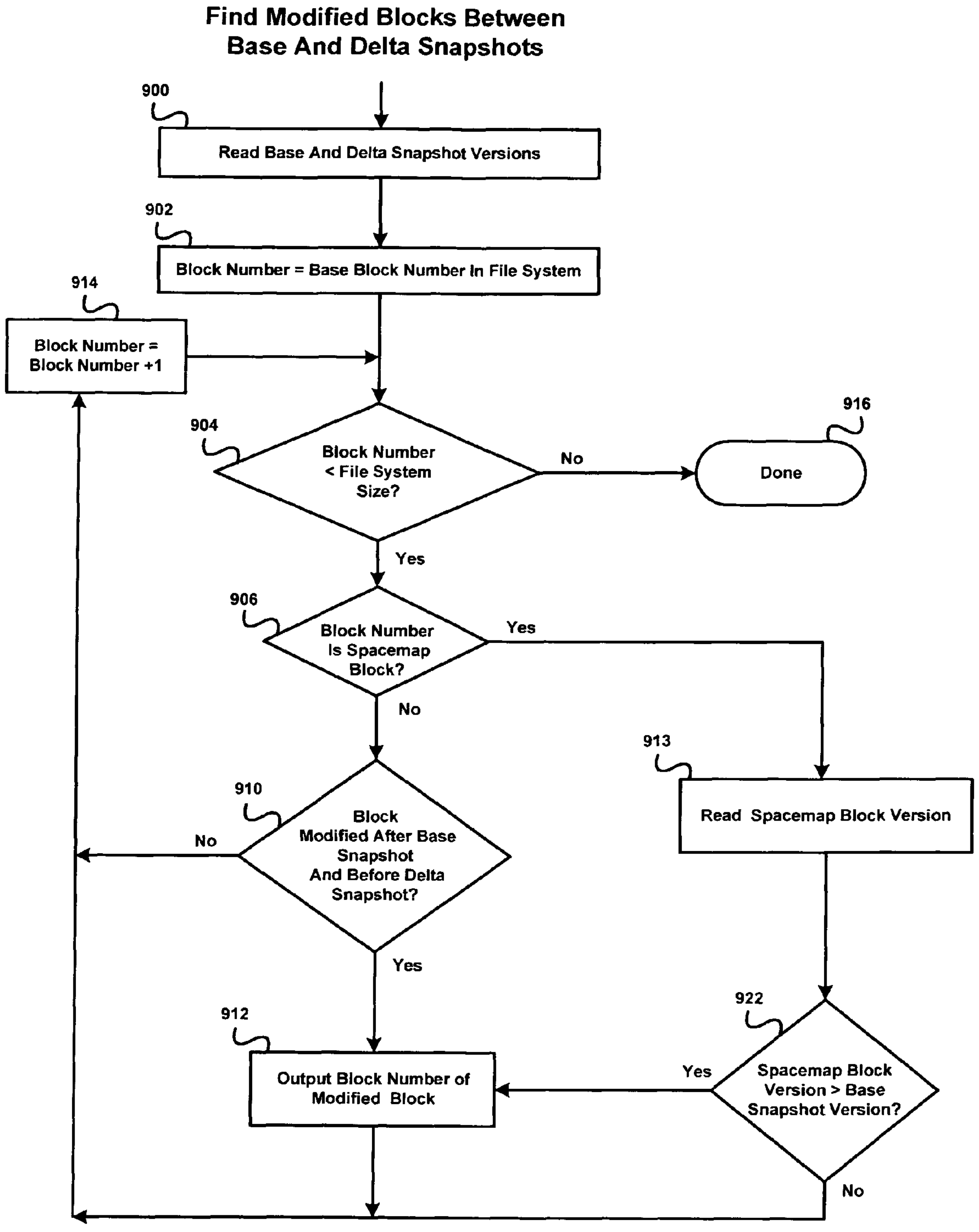
FIG. 24 is a flow diagram illustrating a method for finding all the blocks that have been modified in a delta snapshot since a base snapshot was taken.

FIG. 24 shows a method implemented in a software program executed in a host for finding all the blocks modified in a file system between a base snapshot and a delta snapshot. At step 700, the method reads the base and delta snapshot versions. At step 702, the method sets a block number to the base block number in the file system. At step 704, the method checks if block number is less than the file system size. If not, the method terminates at step 716. Steps 702 and 704 determine the block is in the file system.

If the block is in the file system, the method tests if the block number is a space map block at step 706. If yes, at step 713, the method reads the space map block version. At step 722, the method tests if the version of the space map block is greater than the version of the base snapshot. If yes, the method proceeds to step 712 and outputs the block number of the modified block. If not, the method increments the block number at step 714 and resumes at step 704.

If step 706 determines that the block number is not a space map block, the method proceeds to step 710 that determines if the block was modified after the base snapshot and before the delta snapshot (FIG. 23). If not, the method increments the block number at step 714 and resumes at step 704. If yes, the method outputs the block number of the modified block at step 712, increments the block number at step 714 and resumes at step 704.

Figure 25:
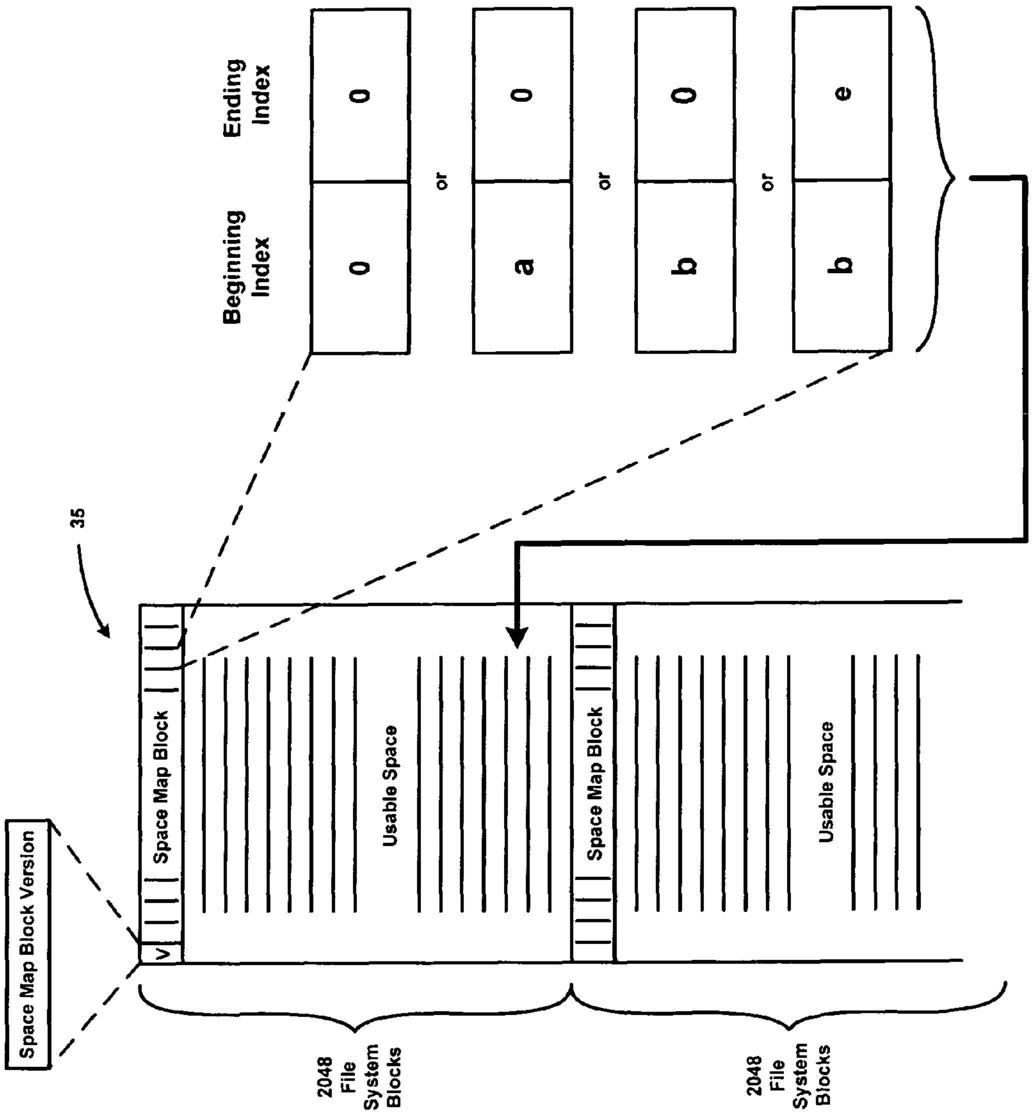
FIG. 25 illustrates the details of the space map blocks and a space map block version.

FIG. 25 illustrates the details of a space map block and its space map block version. The space map block version indicates the version of the file system from the index table (FIG. 3) that last modified the space map block. This permits the file system to identify space map blocks that have been modified.

Figure 26:
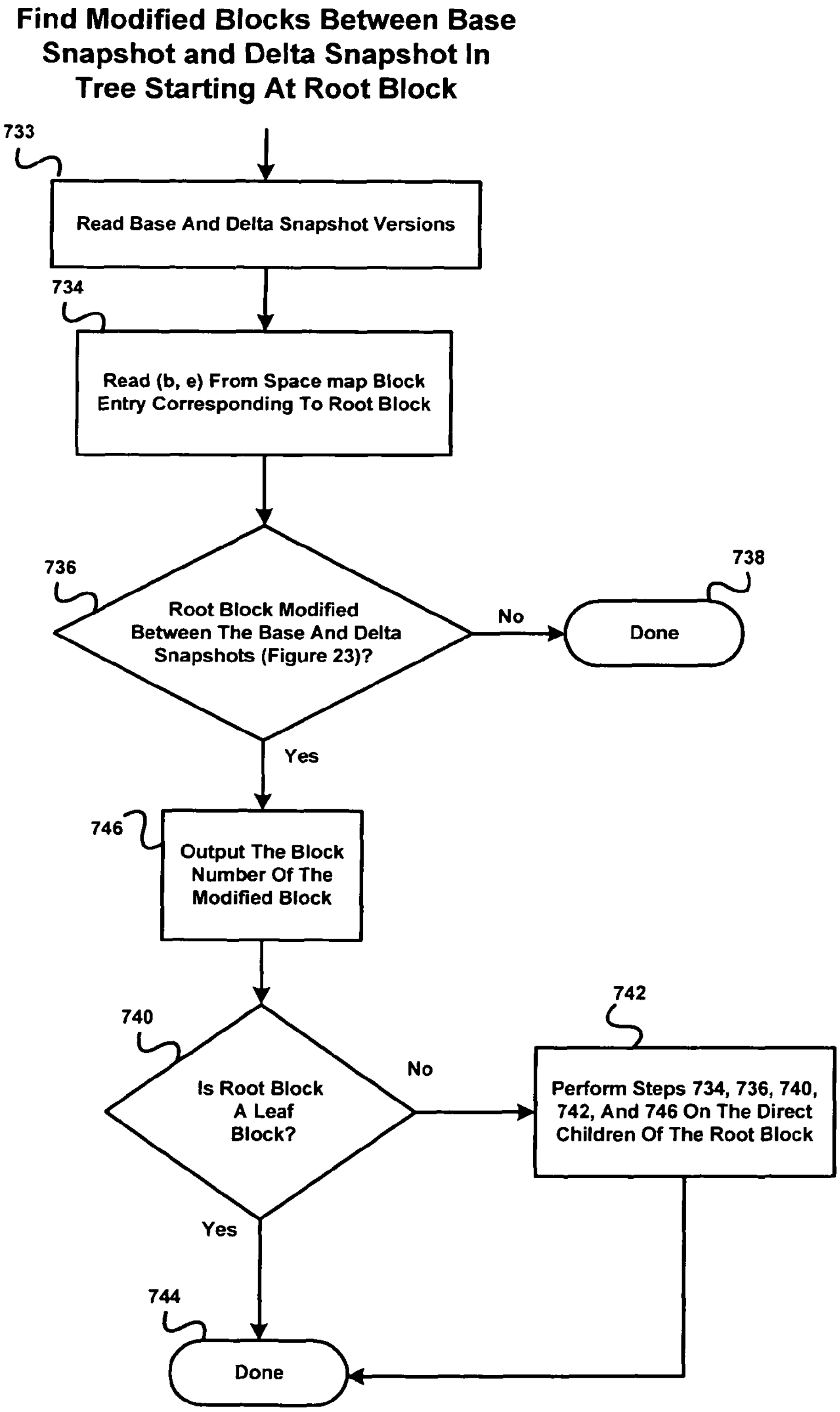
FIG. 26 illustrates a method for finding modified blocks between a base snapshot and delta snapshot by traversing a tree data structure.

FIG. 26 illustrates a method for finding modified blocks between a base snapshot and a delta snapshot in a file system by traversing a tree data structure such as a B-tree or radix tree. Cormen et al., *Introduction to Algorithms* (2003) describes B-trees at pages 434-454 and other suitable data structures and is incorporated by reference herein.

At step 733, the method reads the base snapshot and the delta snapshot versions. At step 734, the method reads (b, e) from the space map block entry that corresponds to the root block of the tree data structure.

At step 736, the method determines if the root block was modified between the base snapshot and the delta snapshot using the method of FIG. 23. If not, the method terminates at step 738. If so, the method outputs the block number of the modified block at step 746.

Next, the method proceeds to step 740 and determines if the root block is a leaf block (i.e., has no descendants). If so, the method terminates at step 744. If not, the method proceeds to step 742 where the method performs steps 734, 736, 740, 742, and 746 on the direct children of the root block.

FIGS. 27-31*c* illustrate methods for finding files, directories, and file blocks modified between a base snapshot and a delta snapshot.

Figure 27:
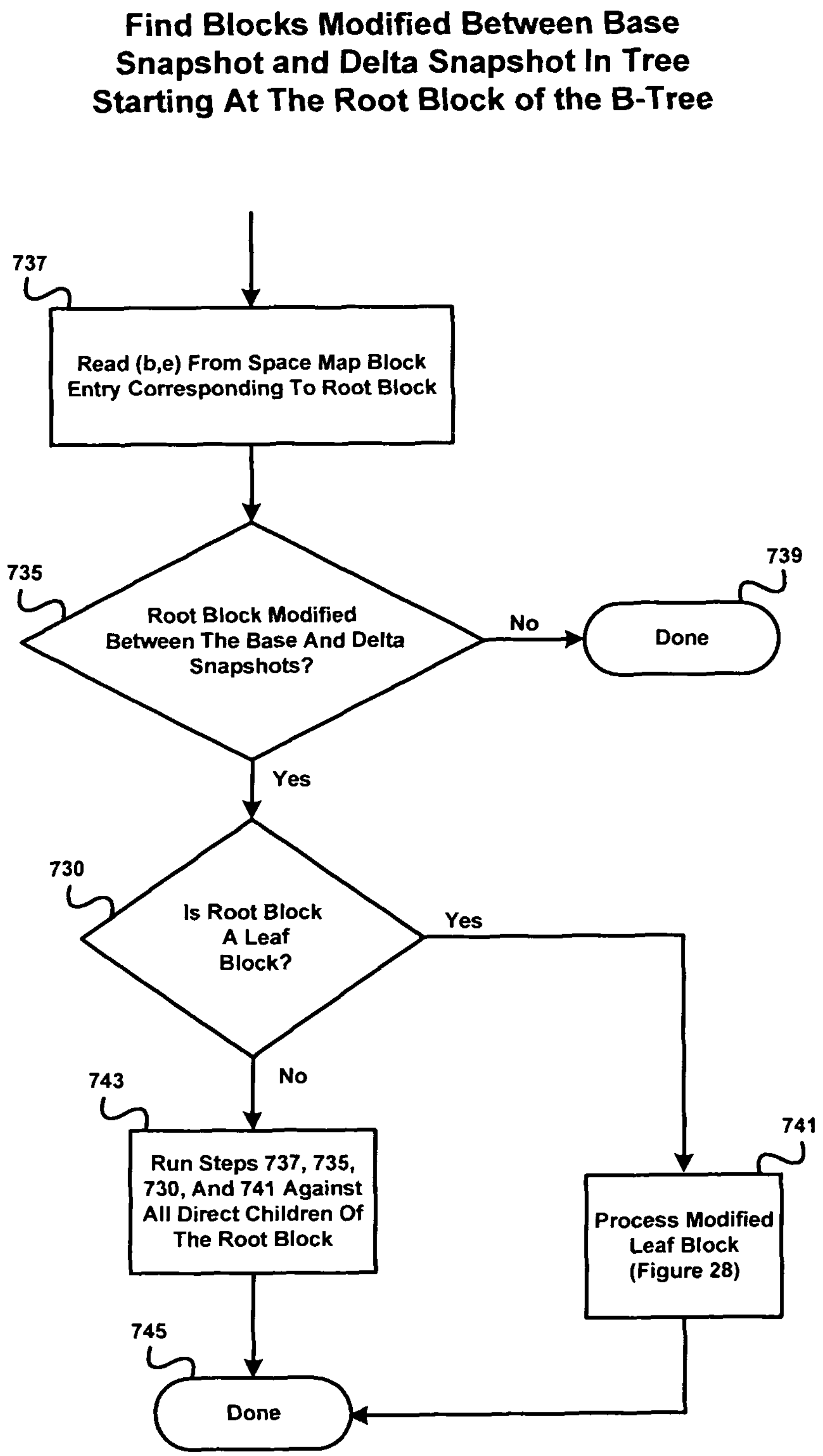
FIG. 27 shows another method for finding block modified between a base snapshot and a delta snapshot in a tree data structure.

FIG. 27 shows a method performed in a host for finding modified blocks on a data storage subsystem between a base and delta snapshot in a file system by navigating a tree data structure. Cormen et al., *Introduction to Algorithms* (2003) describes B-trees at pages 434-454, radix trees at pages 269-270, and is incorporated by reference herein.

At step 737, the method reads the space map block entry (b, e) corresponding to the root block of the tree data structure.

At step 735, the method determines if the root block was modified between the base snapshot and the delta snapshot using the method illustrated in FIG. 23. If not, the method is done at step 739.

If the root block was modified, the method proceeds to step 730. At step 730, the method determines if the root block is a leaf block (i.e., has no descendants). If not, the method proceeds to step 743 where it performs steps 737, 735, 730, and 741 against all direct children of the root block then terminates at step 745.

Figure 28:
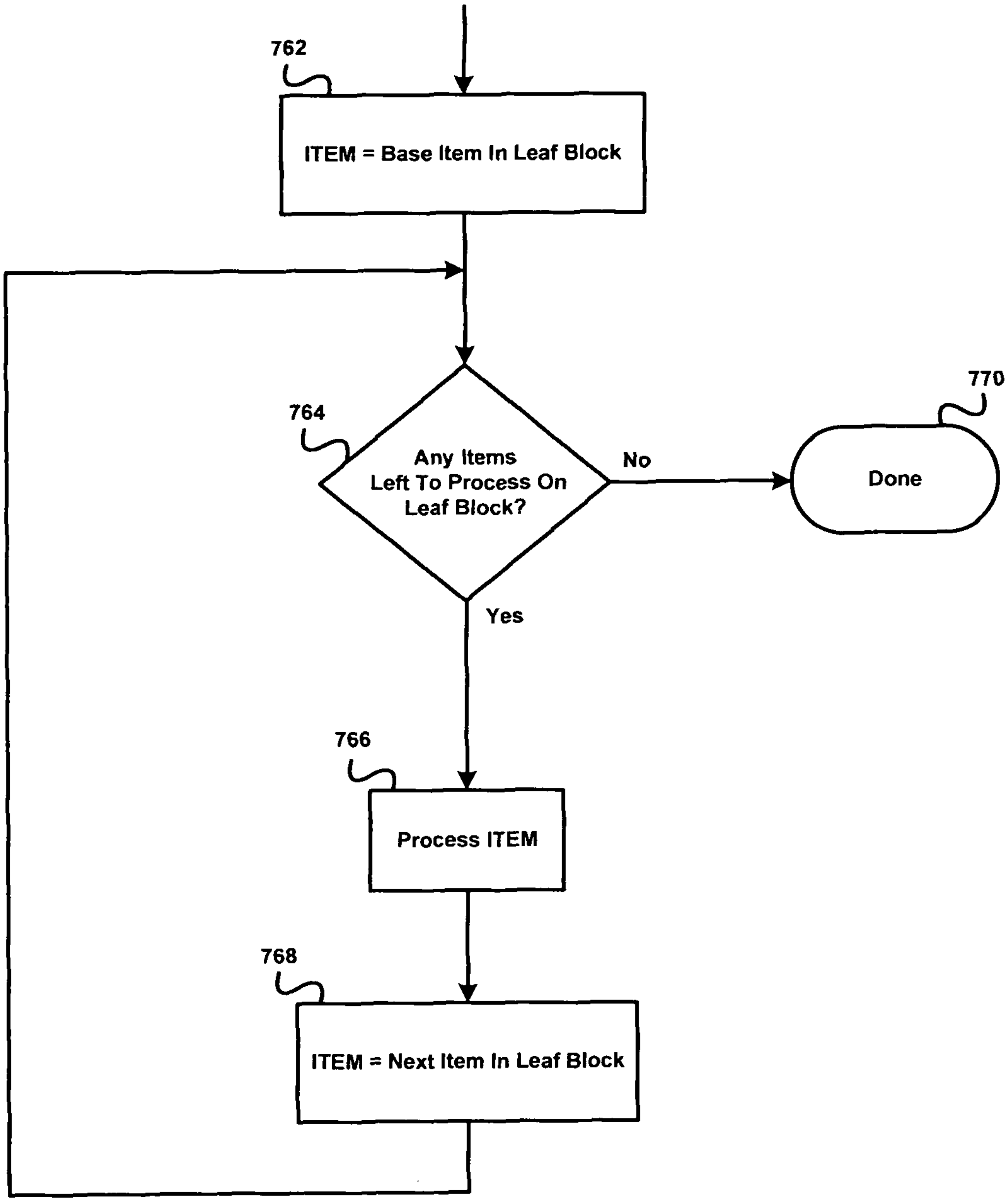
FIG. 28 illustrates a method for processing items in a leaf block of a B-tree data structure.

At step 730, if the method determines the root block is a leaf block, the method processes that modified block at step 741 as set forth in FIG. 28. The method terminates at step 745.

As a result, the method has identified the leaf blocks in the delta snapshot that have been modified since the base snapshot. These leaf blocks will be further processed by the methods illustrated in FIGS. 28-30 to determine what files and directories were modified.

FIG. 28 illustrates a method performed in a host for processing modifications of a leaf block of a B-tree data structure stored in a data storage subsystem. A leaf block contains a number of items. In an embodiment, an item is a key and data, where the data represents either a directory entry or an inode. Silberschatz et al., *Operating System Concepts* (2009) and pages 273-291 of Tanenbaum, *Modern Operating Systems* (2008) describe directories, inodes, and other details of file system implementation, which are incorporated by reference herein. At step 762, the method assigns the base item in the leaf block to a variable named ITEM. At step 764, the method tests if there are any items left to process on the leaf block, and if not, terminates at step 770. If so, the method processes the ITEM at step 766, then sets the variable ITEM to the next item in the leaf block at step 768 and returns to step 764.

Figure 29:
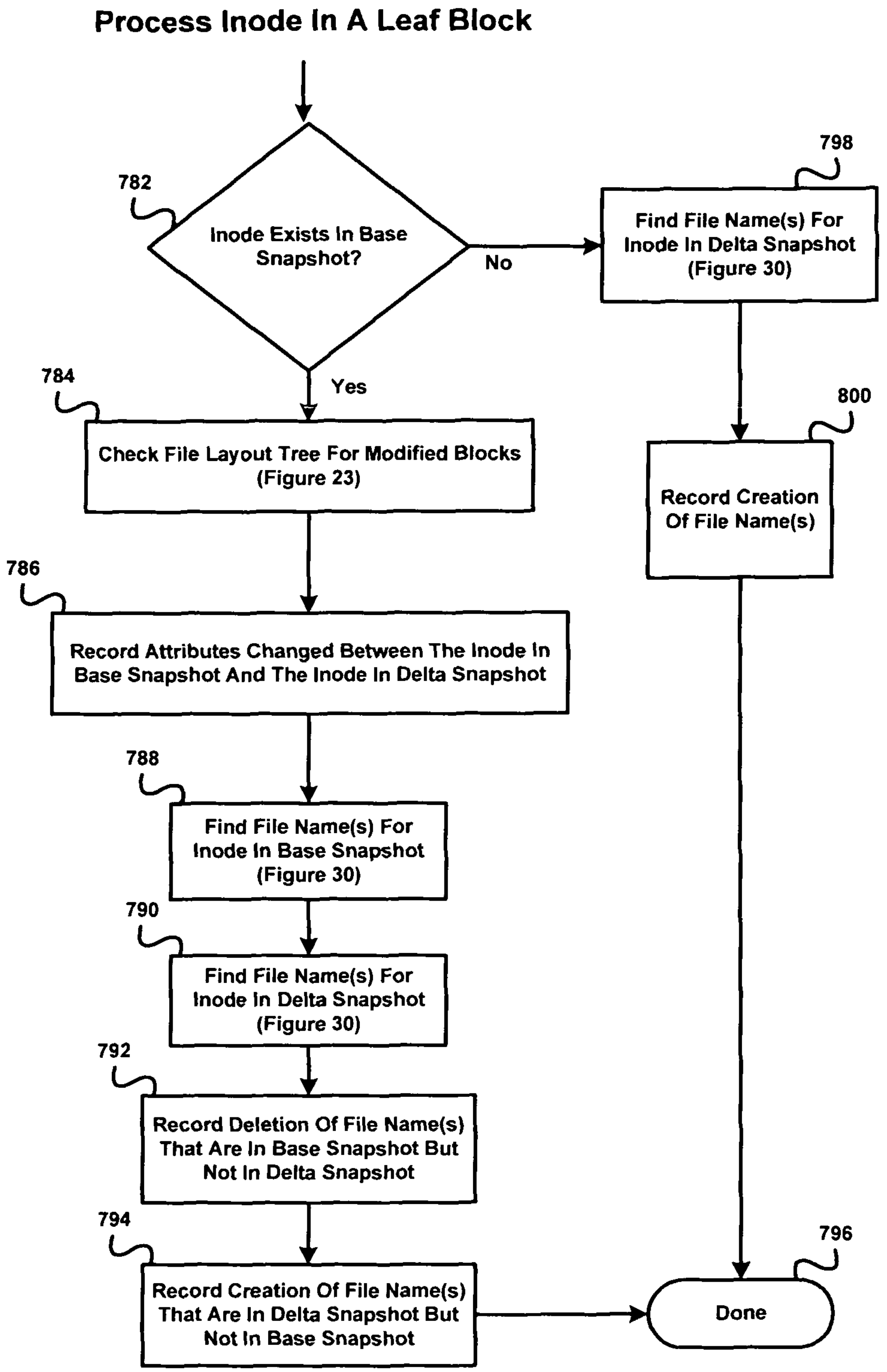
FIG. 29 illustrates a method for processing an inode in a leaf block.
Figure 30:
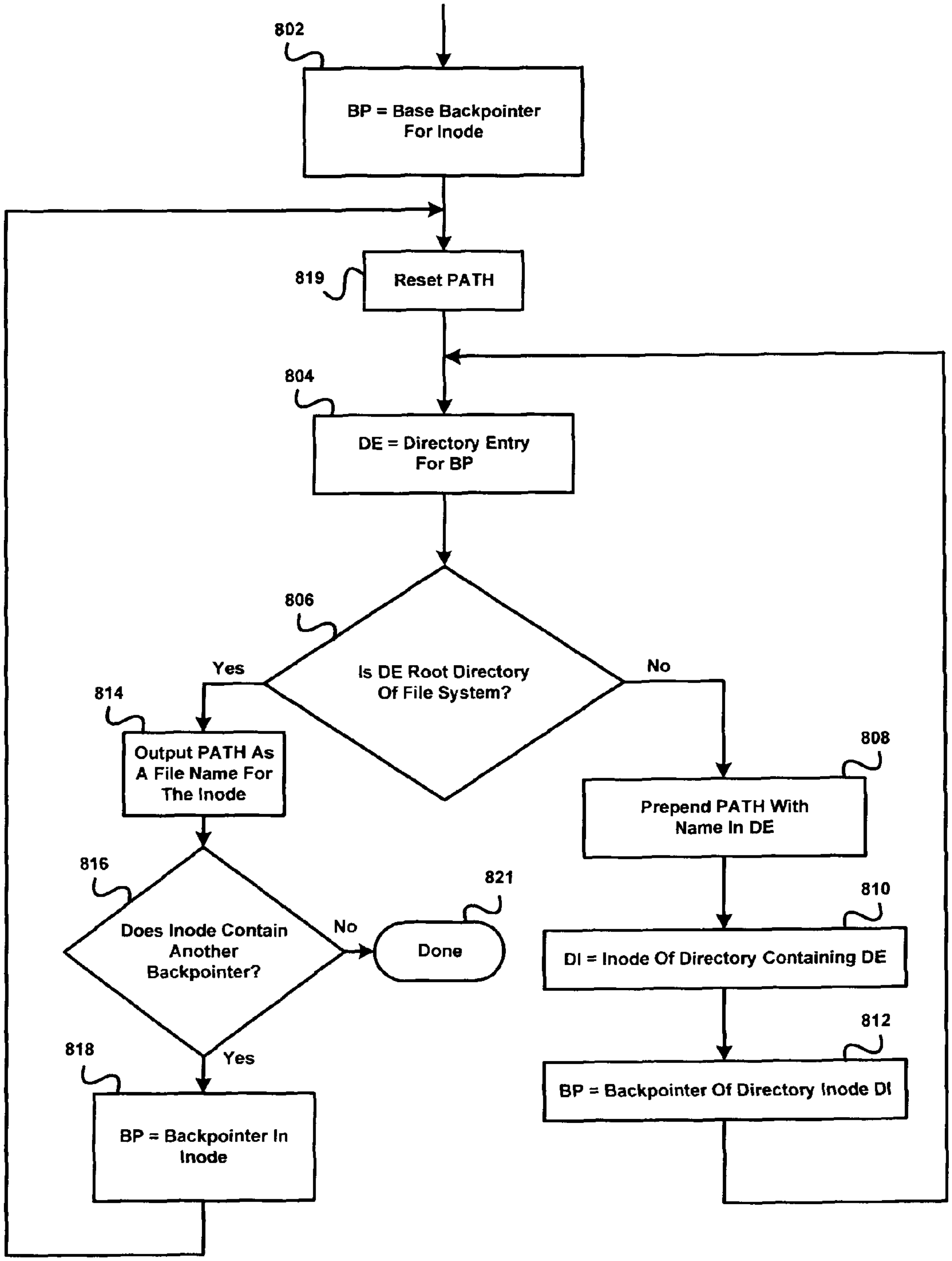
FIG. 30 illustrates a method for finding file names for an inode.

FIG. 29 illustrates a method performed in a host for processing an inode in a leaf block. At step 782, the method tests if an inode exists in a base snapshot. If not, the inode represents a new file in the delta snapshot so the method goes to step 798 where the method finds the file name for the inode in the delta snapshot as illustrated in FIG. 30. In an alternative embodiment, the method finds the files names for all the hard links to the inode at step 798. Tanenbaum, *Modern Operating Systems* (2008) at pages 283-285 describes the details of hard links, which is incorporated by reference herein.

At step 800, the method records the creation of file name(s). In an embodiment, the method records the creation of a single file name. In an alternative embodiment, the method records the creation of all the file names of a file where there are hard links to the file. At step 796, the method is done.

If an inode exists in the base snapshot, the method proceeds to step 784 to check the file layout tree for modified blocks by using the method set forth in FIG. 23. Tanenbaum, *Modern Operating Systems* (2008) describes the details of file layout trees in chapter 6, which is incorporated by reference herein.

Cormen et al., *Introduction to Algorithms* (2003) describes details of a data structures suitable for use as file layout trees, such as a radix tree (chapter 12), a B-tree (chapter 18), as well as other tree data structures (chapters 10-13), which is incorporated by reference herein.

At step 786, the method records the attributes that changed between the inode in the base snapshot and the inode in the delta snapshot. At step 788, the method finds the file names for the inode in the base snapshot as set forth in FIG. 30. In the step 790, the method finds the file names for the inode in the delta snapshot as set forth in FIG. 30. At step 792, the method records the deletion of the file name(s) that are in the base snapshot, but are not in the delta snapshot. At step 794, the method records creation of file name(s) that are in the delta snapshot but not the base snapshot. The method is done at step 796.

FIG. 30 illustrates a method performed in a host for finding file name(s) that correspond to an inode as set forth in steps 788 and 790 of FIG. 29. In an embodiment, the method finds the file names for the inode of a file system by identifying and listing (i.e., enumerating) all the paths from the inode to the root directory of the file system using a depth-first search or a breadth-first search. Cormen et al., *Introduction to Algorithms* (2003) describes details of algorithms suitable for enumerating the paths such as pages 531-547, which is incorporated by reference herein.

In a file system, a directory entry points to an inode that describes the content of a file. The backpointers of an inode list the directory entries that point to the inode. Zhang et al., *Cross-Partition Protocols in a Distributed File Service* (2001) describes backpointers in detail, which is incorporated by reference herein.

At step 802, the method assigns a first backpointer for an inode to a variable BP. The method constructs file names for the inode in a variable called PATH. At step 819, the method resets the variable PATH to an empty string. At step 804, the method assigns the directory entry for the variable BP to a variable DE. At step 806, the method tests if directory entry DE is the root directory of the file system. If yes, the method outputs the string contained in the variable PATH for the file name of the inode at step 814. Next, at step 816, the method tests if the inode contains a next backpointer. If not, the method terminates at step 821.

If the inode contains another backpointer at step 818, the method assigns that backpointer in the inode to the variable BP then resumes processing at step 819.

If at step 806, the method determines that DE is not the root directory of the file system, the method proceeds to step 808 where it prepends PATH with the name in the directory entry DE. At step 810, the method assigns the inode of the directory containing directory entry DE to the variable DI. At step 812, the method assigns the backpointer of directory inode DI to the variable BP then resumes processing at step 804.

Figures 31A, 31B, 31C:
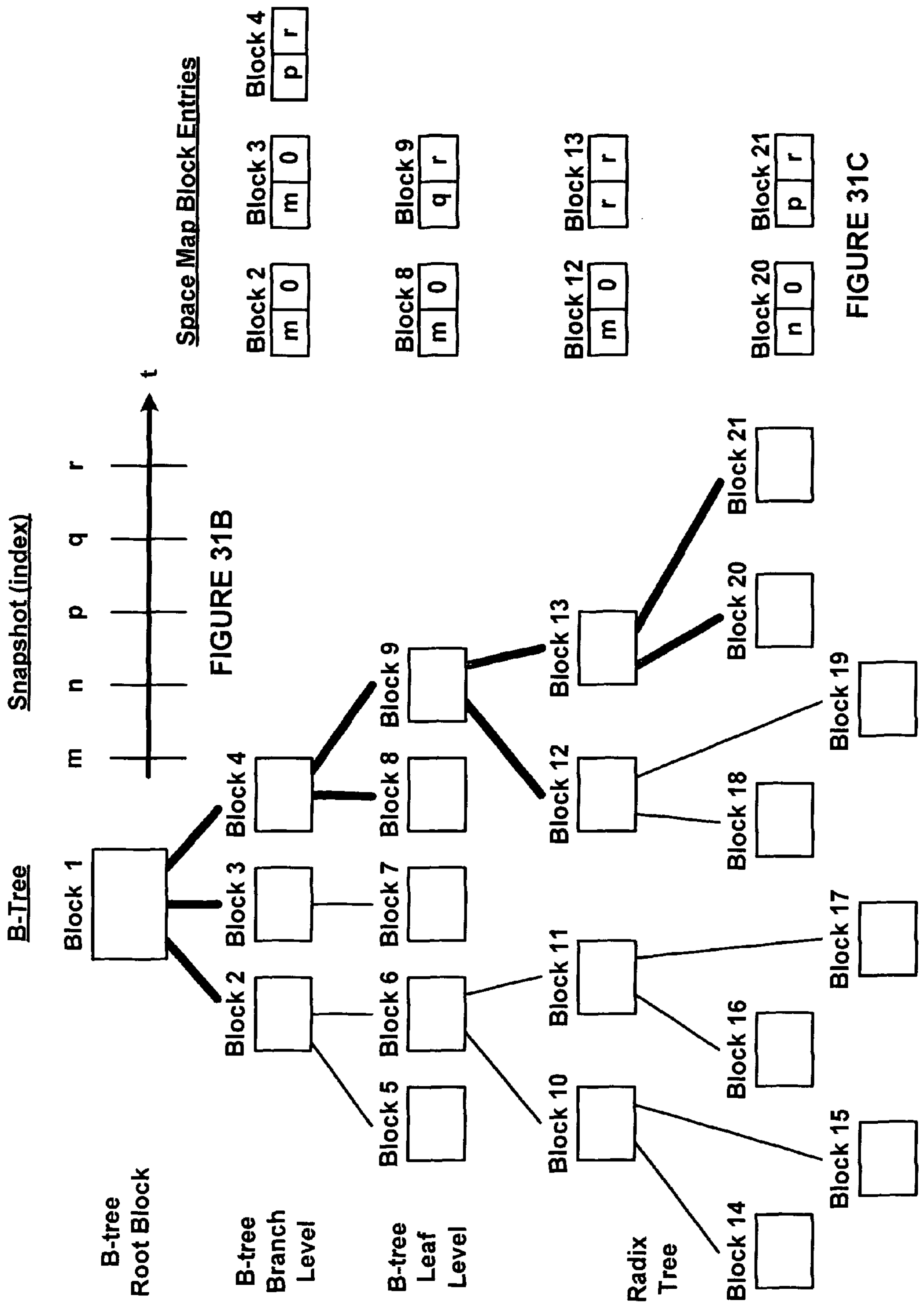
FIGS. 31A-31C illustrate a method of traversing B-tree and Radix tree data structures to find modified blocks in a file system.

FIGS. 31*a*-31*c* illustrate the method of FIG. 24 performed in a host to find modified blocks by traversing a specific file system representation called a B-tree and a Radix tree. Cormen et al., *Introduction to Algorithms* (2003) describes B-trees at pages 434-454, radix trees at pages 269-270, and other suitable tree data structures and is incorporated by reference herein.

FIG. 31A illustrates a B-tree, a Radix tree, and uses bold to indicate the links that are traversed in the B-tree and the Radix tree.

As shown FIG. 31B, the host has taken snapshots m, n, p, q, and r with respect to time. The variable m represents the index of the base snapshot. The variable r represents the index of the delta snapshot. Each block has a space map block entry. The space map block entries for the blocks in the B-tree are shown in FIG. 31C.

As an example, the method can find any block modified between snapshot n and snapshot r. The method begins at root block 1 and checks its children (i.e., blocks 2, 3, and 4) as shown in FIG. 31A.

Referring to FIG. 31C, the space map block entry (m, 0) for block 2 indicates that the host allocated block 2 in the snapshot m and has not modified it. Likewise, the space map block entry (m, 0) of block 3 indicates the host has not modified block 3. However, the space map block entry (p, r) of block 4 indicates block 4 was modified after snapshot n. Thus, the host adds block 4 to a list of modified blocks.

Next, the host checks block 4 by examining the space map block entries of its children. The space map block entry (m, 0) for block 8 indicates that the host allocated block 8 in snapshot m and has not modified it. However, the space map block entry (q, r) of block 9 indicates that block 9 was modified after the snapshot n. Thus, the host adds block 9 to the list of modified blocks.

The host checks block 9 by examining the space map block entries of its children. The space map block entry (m, 0) for block 12 indicates that the host allocated block 12 in snapshot m and has not modified it. However, the space map block entry (r, r) of block 13 indicates that block 13 was modified after the snapshot n. Thus, the host adds block 13 to the list of modified blocks.

The host checks block 13 by examining the space map block entries of its children. The space map block entry (n, 0) for block 20 indicates that the host allocated block 20 in the snapshot n and has not modified it. However, the space map block entry (p, r) of block 21 indicates that block 21 was modified after the snapshot n. Thus, the host adds block 21 to the list of modified blocks. Block 21 is a leaf block, i.e., has no children.

Figure 32:
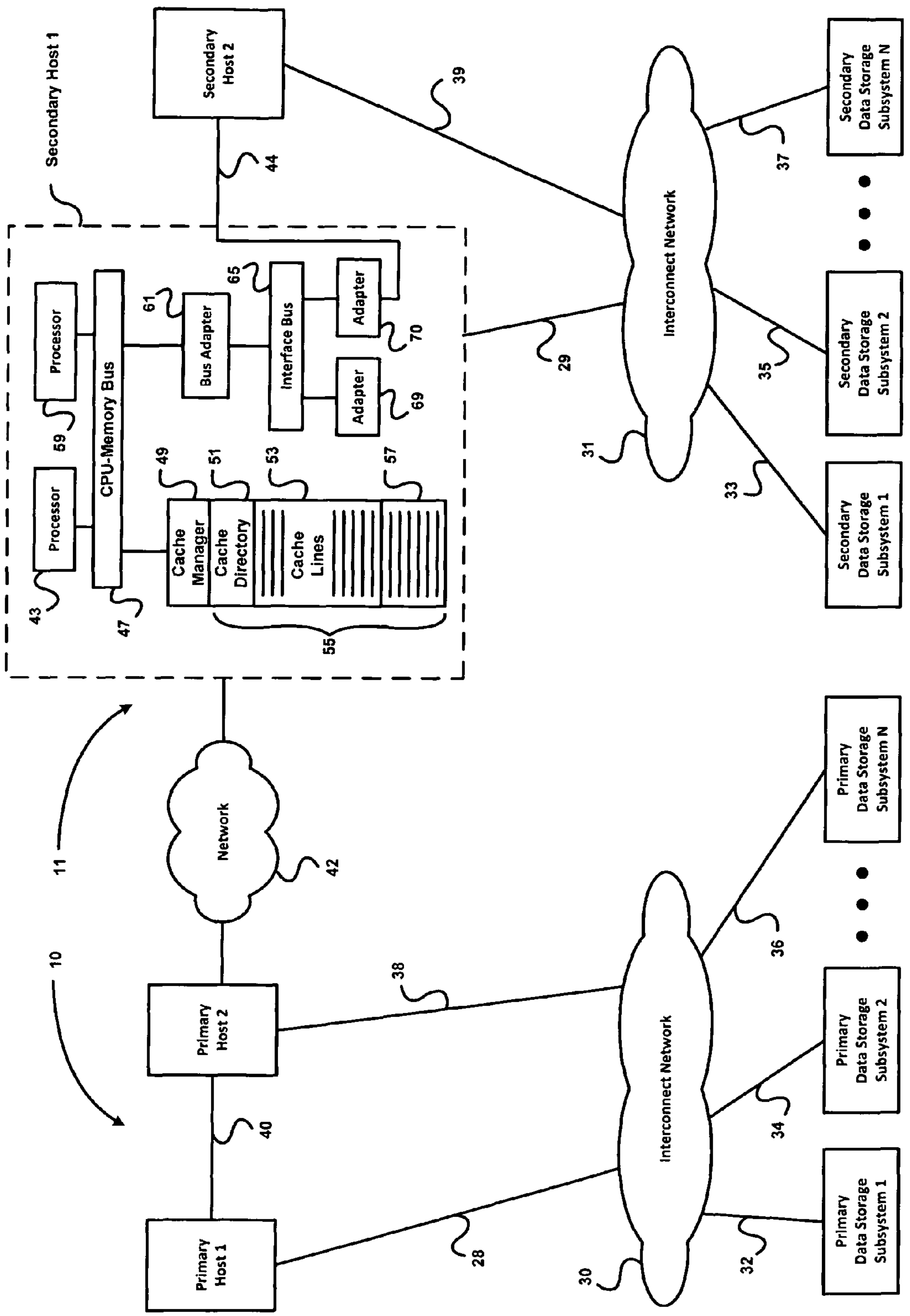
FIG. 32 illustrates an embodiment of a primary data storage system and a secondary data storage system.

FIG. 32 illustrates a primary data storage system 10 and a secondary data storage system 11 connected through a computer network 42. If the applications change data at the primary data storage system 10, the data replication system transmits the changes over the computer network 42 to the secondary data storage system 11.

Each data storage system includes one or more hosts coupled to data storage subsystem(s). Each host is a computer that can connect to client(s), data storage subsystem(s), and other hosts. Each host provides software/hardware interfaces such as network interface cards and software drivers to implement Ethernet, Fibre Channel, ATM, SCSI, or InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, each host includes a motherboard with a CPU-memory bus 47 that communicates with dual processors 43 and 59. A processor could be a suitable general-purpose processor running software, an ASIC dedicated to perform the operations described herein, or a field programmable gate array (FPGA). The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The cache memory 55 is nonvolatile memory, volatile memory, or a combination of both. A cache manager 49 manages the cache memory 55 of each host. The cache memory 55 includes a cache directory 51, volatile cache lines 53, and nonvolatile cache lines 57. The nonvolatile cache lines 57 protect data in the event of a power interruption or a host failure. Data is defined as including user data, instructions, and metadata. Nonvolatile memory may be nonvolatile solid state memory or implemented with a battery that supplies power to the DRAM to make it nonvolatile memory when a conventional external power interrupt circuit detects a power interruption or with inherently nonvolatile semiconductor memory.

Each host includes a bus adapter 61 between the CPU-memory bus 47 and an interface bus 65. Each host runs an operating system such as Linux, UNIX, a Windows OS or another suitable operating system. Tanenbaum, *Modern Operating Systems* (2009?) describes operating systems in detail and is hereby incorporated by reference.

The secondary host 1 is representative of the other hosts, but it is not essential to the invention that the hosts be identical.

The secondary host 1 can communicate with the secondary host 2 through an interconnect 44, shown as connected to an adapter 70 to the interface bus 65. The PCI bus is one suitable interface bus and the interconnect 44 may be any suitable known bus, SAN, LAN, or WAN technology. In an embodiment, the interconnect 44 is a dedicated Fibre Channel (FC) point-to-point link that connects to FC-PCI bus adapter 70 to provide fast point-to-point communication between the hosts.

In an alternative embodiment, the interconnect network 31 such as a FC fabric provides extra bandwidth for host-to-host communications. In this embodiment, links 29 and 39 connect to the interconnect network 31 and the hosts use link 29 and link 39 when available. FC standard software can set priority levels to ensure high priority peer-to-peer requests, but there will still be some arbitration overhead and latency in claiming ownership of the links. For example, if links 29 and 39 are busy transferring data when a write request arrives, that operation must complete before either link is free for arbitration.

If the interconnect 44 ever fails, communication between hosts can be handled using the interconnect network 31. The interconnect network 31 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *Designing Storage Networks* (2003), Clark, *IP SANs: A Guide to iSCSI, iFCP, and FCIP Protocols for Storage Area Networks* (2002), and Clark, *Designing Storage Area Networks* (1999) which are incorporated herein by reference.

In an embodiment, the data storage subsystems shown in FIG. 32 can be those described in the U.S. patent application Ser. No. 10/677,560, entitled, Systems and Methods of Multiple Access Paths to Single Ported Storage Devices, filed on Oct. 1, 2003, and incorporated by reference herein. It is understood, however, that other storage device(s) or data storage subsystems could be used for the storage instead of the data storage subsystems described in that U.S. patent application.

As shown in FIG. 32, the secondary host 1 connects, or couples, to the secondary data storage subsystem 1 through the bus adapter 61, the interface bus 65, the adapter 69, the link 29, the interconnection network 31, and the link 33. To connect to the secondary data storage subsystem 2, the secondary host 1 uses the same I/O path except the data passes through link 35, while the secondary host 2 uses the same type of I/O path plus link 33 to communicate with the secondary data storage subsystem 1, link 35 to communicate with the secondary data storage subsystem 2, or link 37 to the secondary data storage subsystem N.

Figure 33:
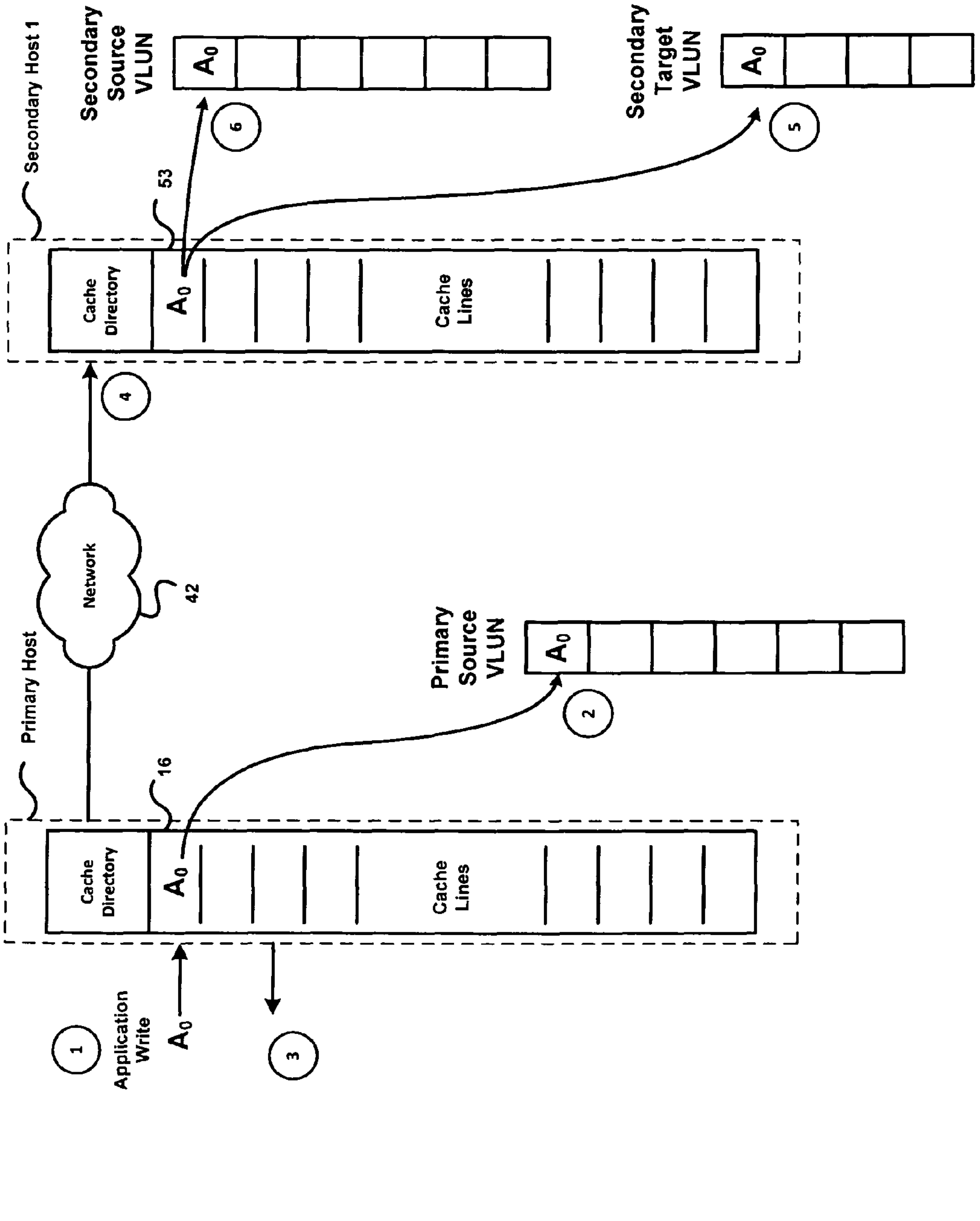
FIG. 33 illustrates how a data block is replicated from the primary to the secondary data storage systems.

FIG. 33 illustrates how a data block is replicated from the primary to the secondary data storage systems. At step 1, an application sends a write command for a first block, say $A_0$, to the primary host. An application is program code that reads and writes data that is stored in the data storage system. The primary host receives the write command and stores the first block $A_0$ in the cache lines 16. The block may be an individual data block (e.g., 512 bytes) or a plurality of blocks (e.g., each block 1K to 8K or more). At step 2, the primary host writes the first block $A_0$ to the primary source VLUN. At step 3, the primary host acknowledges that the write of the first block $A_0$ has occurred to the application. At step 4, the primary host transmits the first block $A_0$ to the secondary host 1 over the network 42. At step 5, the secondary host 1 writes the first block $A_0$ from cache lines 53 to a secondary target VLUN. For additional blocks, the primary host and the secondary host 1 repeat steps 1-5 for each block. At step 6, when the secondary host 1 has received all of the blocks of a data set, the secondary host 1 writes the blocks of the data set to the secondary source VLUN.

Figure 34:
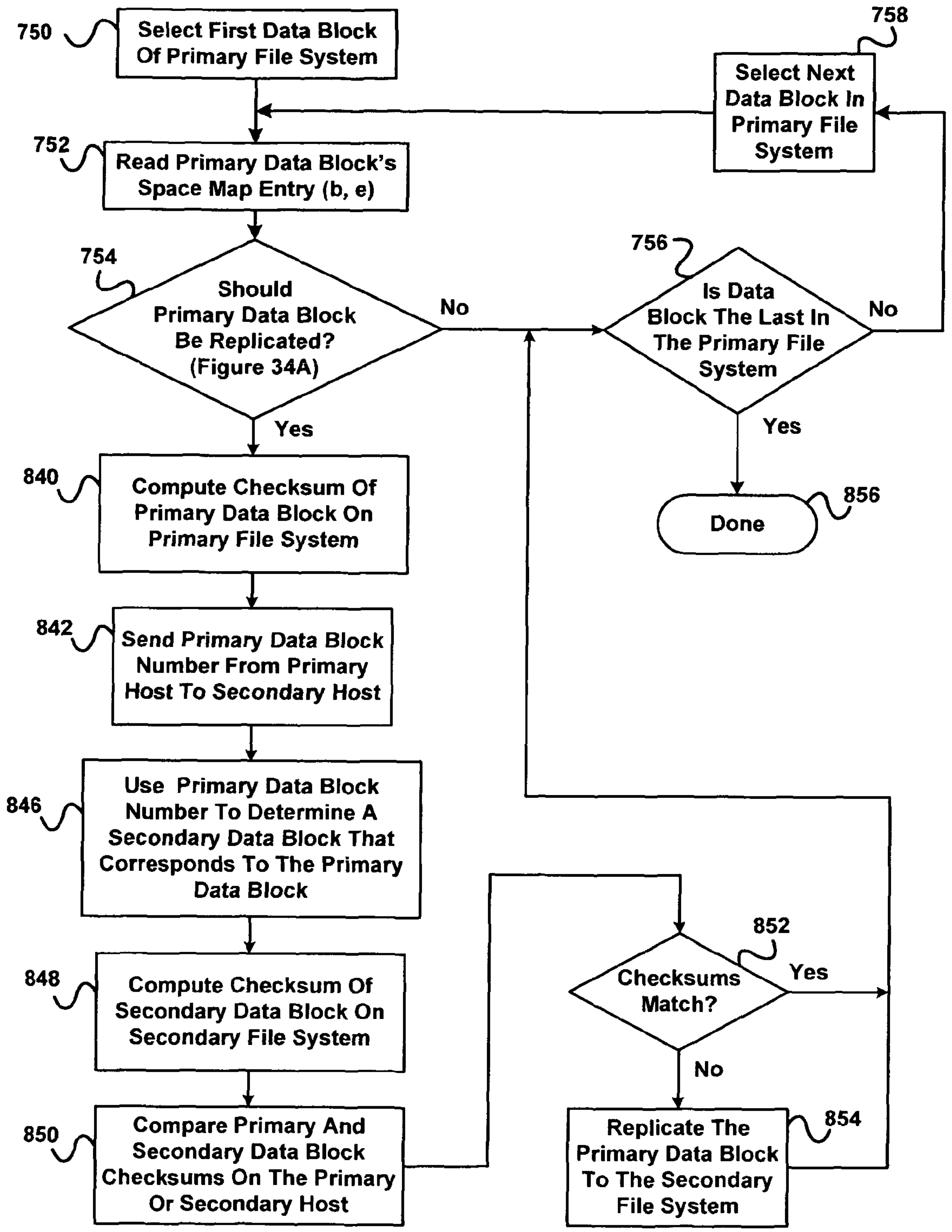
FIG. 34 illustrates a method of replicating a primary file system on a primary host to a secondary file system on a secondary host

FIG. 34 illustrates a method of replicating a primary file system on a primary host to a secondary file system on a secondary host.

At step 750, the primary host selects the first data block of a primary file system from cache memory 55 using the cache manager 49 as described in connection with FIG. 32. For brevity, the method of data replication will be described as carried out by a primary host (e.g., primary host 1 shown in FIG. 32) and a secondary host (e.g., secondary host 1 shown in FIG. 32) without reference to each step described in FIG. 33 with the understanding that the primary and secondary hosts preferably use cache and VLUNs as shown in FIG. 33. Each data block of the primary file system is referred to as a primary data block and each data block of the secondary file system is referred to as a secondary data block.

At step 752, the primary host reads the primary data block's space map entry (b, e). At step 754, the primary host determines if the primary data block should be replicated on the secondary file system by reading the primary data block's space map entry (b, e). The variable b represents the first snapshot and the variable e represents the last snapshot using the primary data block.

If the primary host determines at step 754 that the primary data block should not be replicated, the primary host will next determine if the primary data block is the last data block (e.g., block with highest number) of the primary file system at step 756. In an embodiment, the primary host can determine when it reaches the end of the file system by comparing the primary data block number being processed with the last block number in the file system. If the primary host has read all data blocks of the primary file system, the method is done at step 856. If not, the primary host selects the next data block in the primary file system for processing at step 758.

If the primary host determines a primary data block should be replicated at step 754, the primary host computes the checksum of the primary data block at step 840. At step 842, the primary host sends the primary data block number to the secondary host over the network 42 (FIG. 32). At step 846, the secondary host uses the primary data block number to determine a secondary data block that corresponds to the primary data block. In an embodiment, the secondary source VLUN shown in FIG. 33 will have the same data block numbers as the primary source VLUN. At step 848, the secondary host computes the checksum of the secondary data block. At step 850, the primary host or the secondary host compares the primary and secondary data block checksums. If the primary and secondary checksums match, the primary host determines if the data block is the last data block in the primary file system and if not, selects the next data block in the primary file system at step 758. If it is the last data block, the method is done at step 856.

If the primary and secondary checksums do not match (i.e., mismatch) indicating the secondary data block does not correspond to the primary data block, the primary host replicates the primary data block to the secondary file system by sending the primary data block from the primary host over network 42 to the secondary host.

Figure 35A:
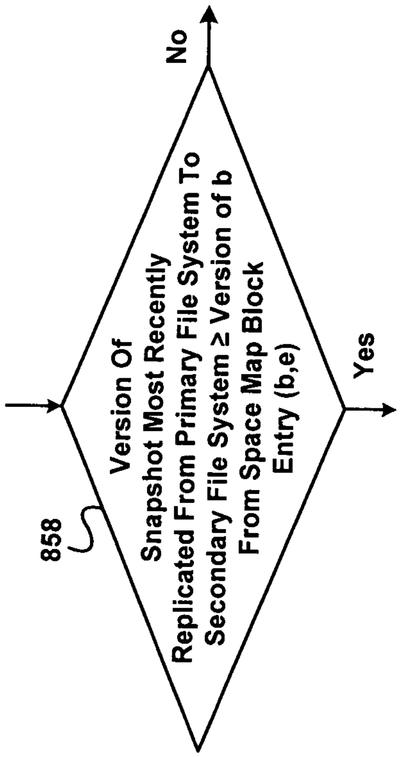
FIG. 35A illustrates a method of determining a primary data block number to send to the secondary host.

FIG. 35A illustrates a method of determining a primary data block number to send to the secondary host described earlier in connection with step 754 in FIG. 34. At step 858, the primary host determines whether the version of the snapshot most recently replicated from the primary file system to the secondary file system is greater than or equal to the version of b from the space map block entry (b, e) of the primary data block. If yes, the primary host computes the checksum of the primary data block at step 840 (FIG. 34). If not, the method determines if the data block is the last in the primary file system at step 756 (FIG. 34).

Figure 35B:
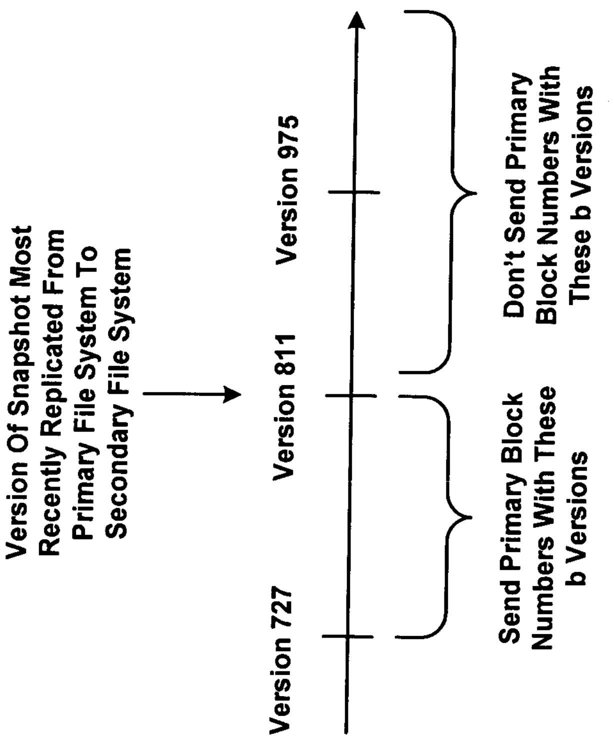
FIG. 35B illustrates when the primary data block number is sent to the secondary host.

FIG. 35B illustrates when the primary data block number is sent to the secondary host. The first snapshot of the primary file system is assigned version 727, later a second snapshot of the primary file system is assigned version 811, and still later another snapshot of the primary file system is assigned version 975. The snapshot assigned version 727 and snapshot assigned version 811 have been replicated on the secondary file system, but not the snapshot assigned 975. Thus, the snapshot assigned version 811 is the version of the snapshot most recently replicated. If version 811 is greater than or equal than the version of b of a primary data block, the primary host will send the primary data block number to the secondary host. If not, the primary host will not send the primary data block number because those data blocks do not exist on the secondary host.

Space map blocks are a small fraction of the storage allocated to the file system. FIG. 4 is not to scale and the ratio of usable space to space map blocks may be, e.g., 1920:1. Space map blocks are also more likely to be corrupt because they are frequently updated. Thus, in an embodiment, the primary host may replicate each space map block from the primary file system to the secondary host without a check sum of the primary data block described in FIG. 34.

Figure 36:
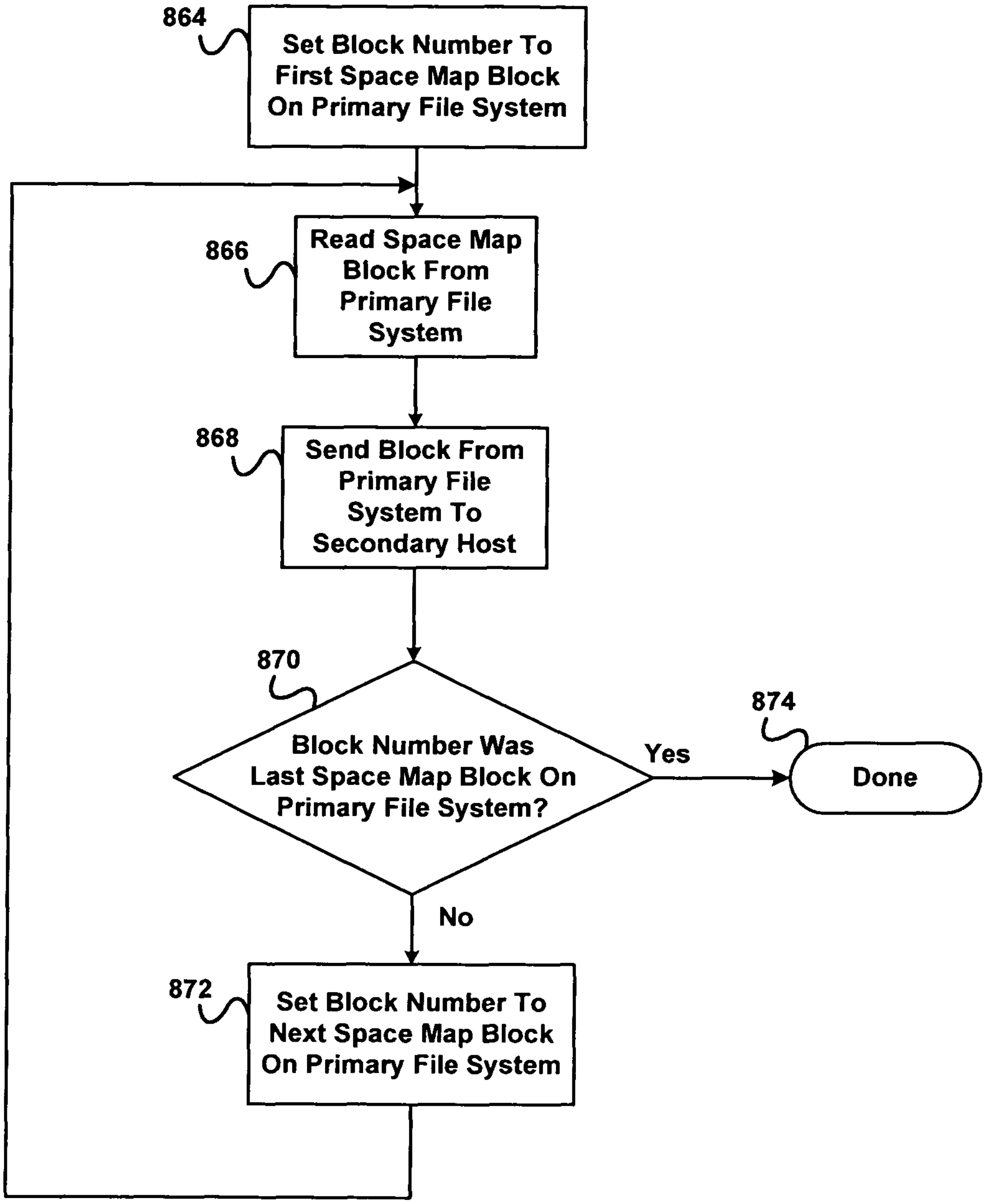
FIG. 36 illustrates a method of reading each space map block from the primary file system and sending the space map block to the secondary host.

Thus, the primary host sets the block number to the first space map block on the primary file system at step 864 as shown in FIG. 36. At step 866, the primary host reads the space map block from the primary file system. At step 868, the primary host sends the space map block from the primary file system over network 42 to the secondary host. At step 870, the primary host determines if the block is the last space map block on the primary file system. If not, the primary host sets the block number to the next space map block on the primary file system at step 872. If yes, the method is done at step 874.

Figure 37:
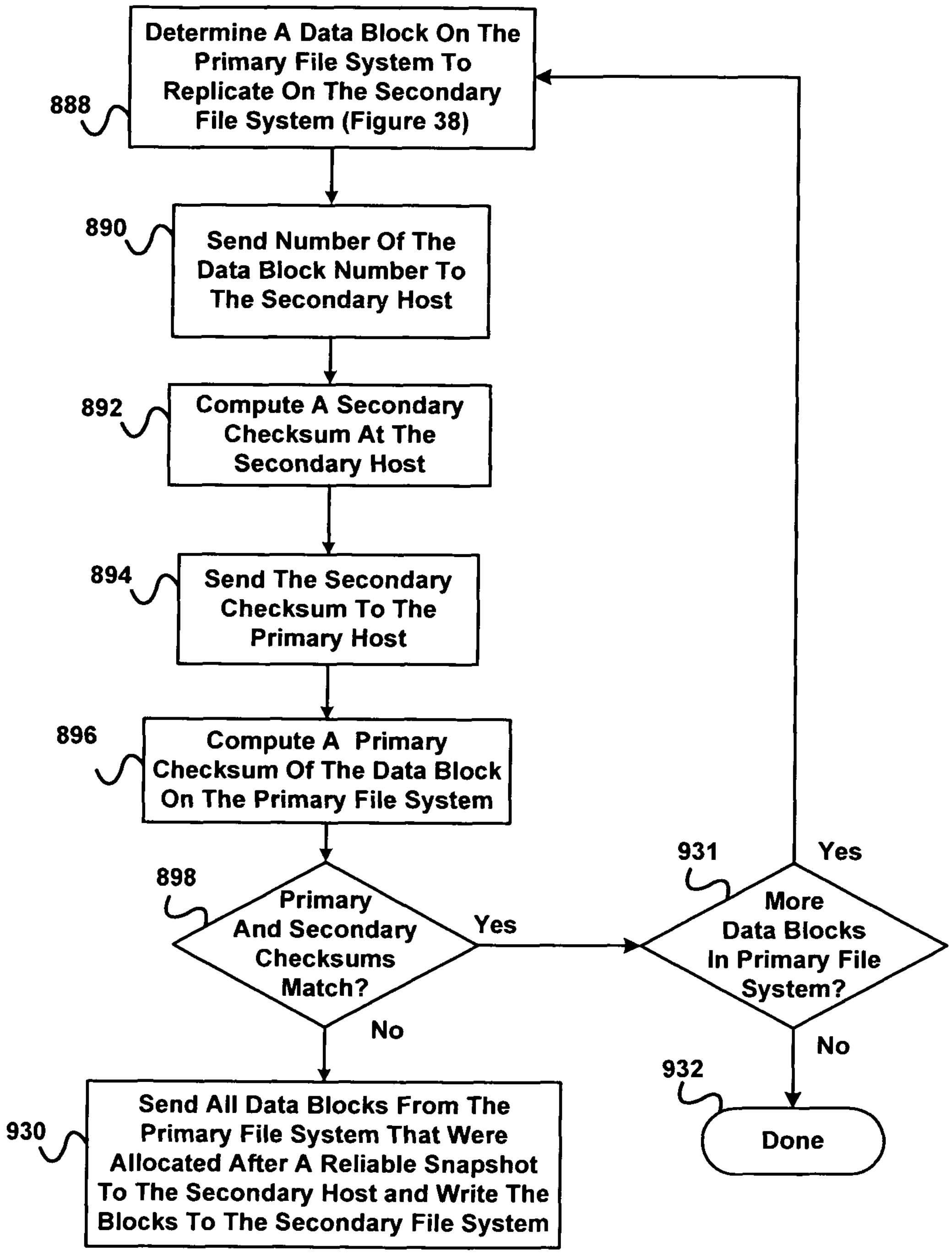
FIG. 37 illustrates another method of replicating a primary file system on a primary host to a secondary file system on a secondary host.

FIG. 37 illustrates another method of replicating a primary file system on a primary host to a secondary file system on a secondary host. At step 888, the primary host determines a data block on the primary file system to replicate on the secondary file system. At step 890, the primary host sends the primary data block number to the secondary host. At step 892, the secondary host reads a data block from the secondary file system that corresponds to the primary data block number and computes the checksum of the corresponding secondary data block. At step 894, the secondary host sends the secondary checksum to the primary host. At step 896, the primary host computes a checksum of the data block on primary file system. At step 898, the primary host determines if the primary checksum and the secondary checksum match. If yes, the primary host determines if there are more data blocks in the primary file system at step 931. If not, the method is done at step 932. If yes, the method returns to step 888. If the checksums mismatch at step 898, the primary host sends all of the data blocks from the primary file system that were allocated after the reliable snapshot of the primary file system to the secondary host and the secondary host writes the data blocks to the secondary file system at step 930.

Figure 38:
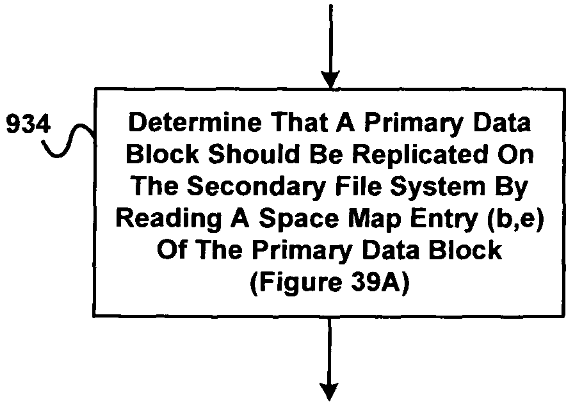
FIG. 38 illustrates a method of determining the primary data block to replicate on the secondary file system by reading a space map block entry (b, e) of the primary data block.

FIG. 38 illustrates an embodiment step 888 in FIG. 37 for determining the data block to replicate on the secondary file system by reading a space map block entry (b, e) of the primary data block.

Figure 39A:
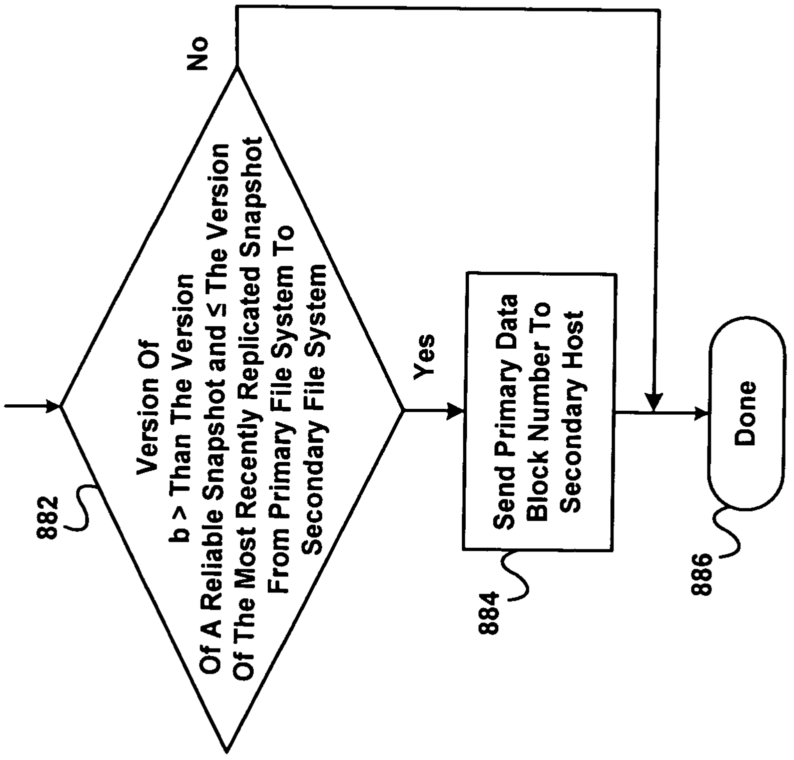
FIG. 39A illustrates a method of determining a primary data block number to send to the secondary host.
Figure 39B:
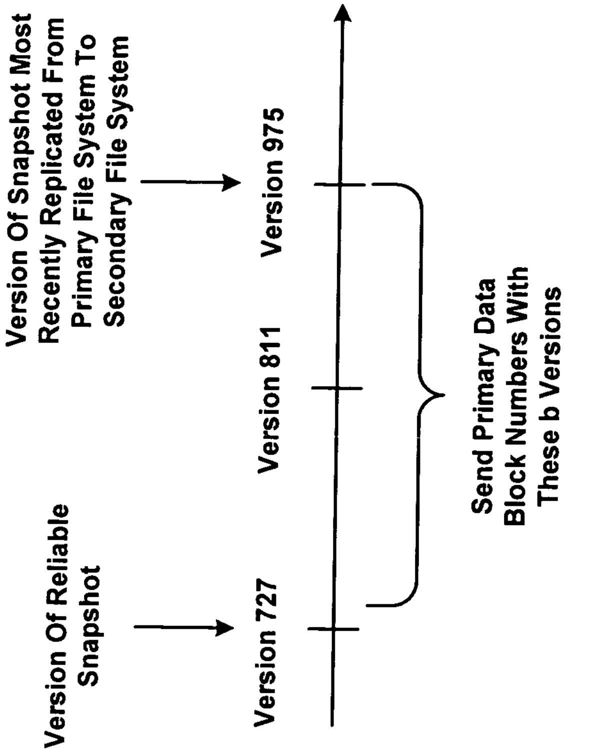
FIG. 39B illustrates when the primary data block number is sent to the secondary host.

FIGS. 39A-39B illustrate a method of determining a primary data block number to send to the secondary host.

FIG. 39A illustrates a method of determining a primary data block number to send to the secondary host. At step 882, the primary host determines whether the version of b from the space map block entry (b, e) of the primary data block is between the version of a reliable snapshot and the version of the snapshot most recently replicated from the primary file system to the secondary file system. If yes, the primary host sends the primary data block number to the secondary host at step 884 and is done at step 886. If not, the method of determining whether to send the primary data block number is done at step 886.

FIG. 39B illustrates when the primary data block number is sent to the secondary host. A snapshot of the primary file system is assigned version 727, later in time a second snapshot of the primary file system is assigned version 811, and still later another snapshot of the primary file system is assigned version 975. The snapshot assigned version 727 is reliable (correctly replicated on the secondary file system) and version 975 is the snapshot most recently replicated to the secondary file system. If the version of b of a primary data block is greater than version 727 and less than or equal to version 975, the primary host will send the primary data block number to the secondary host. If b of the primary data block being processed is less than or equal to snapshot version 727, it is not necessary to send the primary data block number replicate since it is successfully replicated. If b of the primary data block is greater than snapshot version 975, the primary host will not send the primary data block number to the secondary host because those data blocks do not exist on the secondary host.

Figure 40:
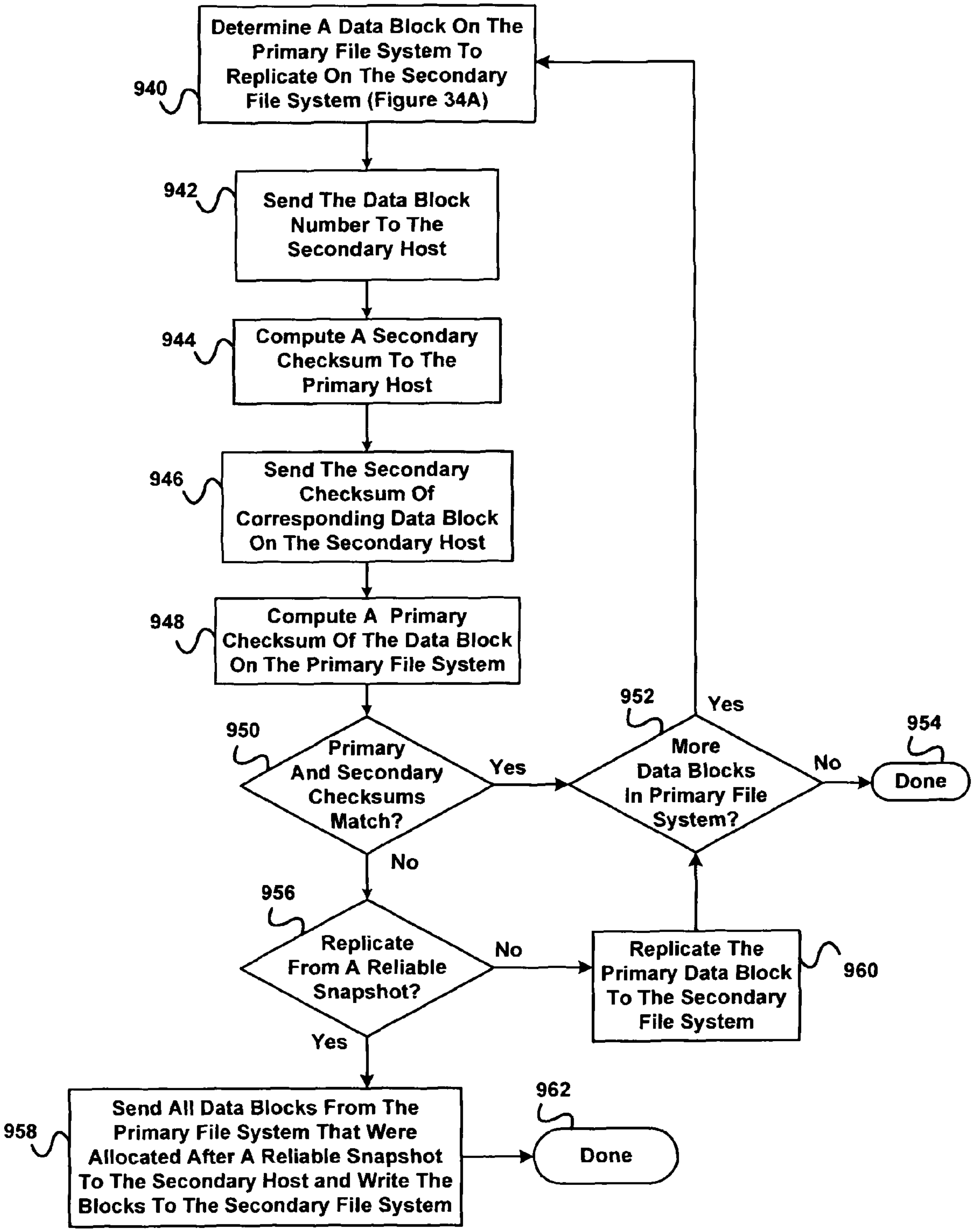
FIG. 40 illustrates a method of data replication where the method will either replicate from a reliable snapshot of the primary file system or continue to replicate from checksum comparisons.

FIG. 40 illustrates a method of data replication where the method will either replicate from a reliable snapshot of the primary file system or continue to replicate from checksum comparisons. At step 940, the primary host determines a data block on the primary file system to replicate on the secondary file system. In an embodiment, step 940 is implemented according to the method illustrated in FIG. 34A. At step 942, the primary host sends the primary data block number to the secondary host. At step 944, the secondary host reads a data block from the secondary file system that corresponds to the primary data block number and computes the checksum of the corresponding secondary data block. At step 946, the secondary host sends the secondary checksum over network 42 to the primary host. At step 948, the primary host computes a checksum of the data block on primary file system. At step 948, the primary host determines if the primary checksum and the secondary checksum match. If yes, the primary host determines if there are more data blocks in the primary file system. If not, the method is done at step 954. If yes, the method returns to step 940.

If the checksums mismatch, the primary host determines if it will replicate from a reliable snapshot based on different objectives. If time to complete the data replication is important and the reliable snapshot of the primary file system is recent (e.g., minutes ago), the primary host may determine to replicate from the reliable snapshot by sending all the data blocks from the primary file system that were allocated after a reliable snapshot to the secondary host which will write the data blocks to the secondary file system at step 958. The method is done at step 962. In contrast, if the reliable snapshot of the primary file system is not recent (e.g., days or weeks ago), the primary host may determine not to replicate from the reliable snapshot and instead replicate the primary data block to the secondary file system at step 960 and test for more primary data blocks at step 952 as described earlier.

If reducing use of the primary host resources (e.g., memory, internal memory bandwidth, storage device capacity and the storage device bandwidth) is important, the primary host may determine not to replicate from the reliable snapshot, that is, engage in sending all the data blocks from the primary file system that were allocated after a reliable snapshot to the secondary host. Instead, the primary host may reduce a spike in the use of resources by replicating each primary data block that has a checksum mismatch to the secondary file system at step 960 and then testing for more data blocks in the primary file system as described earlier at step 952.

FIG. 41A illustrates a method to estimate the time to replicate from a reliable snapshot and the time to continue to replicate from checksum comparisons. At step 964, the primary host estimates the time to send the data blocks to the secondary host if the primary and secondary checksums do not match and repeats steps for all the other data blocks in the primary file system by using the time to read the remaining data blocks from the primary file system. At step 966, the primary host estimates the time to complete a data replication send all of the data blocks that were allocated after a reliable snapshot to the secondary file system if the primary and secondary checksums do not match (FIG. 41B).

FIG. 41B illustrates reading a snapspace matrix at step 968 and summing the data blocks allocated after a reliable snapshot from the primary file system at step 970 to estimate the time to replicate the remaining data blocks from the primary file system.

FIG. 41C illustrates how the primary host can read a snapspace matrix to estimate the time to replicate the remaining data blocks from the primary file system by summing the data blocks allocated after a reliable snapshot.

As shown, a small snapspace matrix is a two-dimensional array in the file system and indexed by beginning and ending (b, e) snapshot indexes in space map blocks. Index 1 will represent a reliable snapshot and indexes 2 and 3 will represent snapshots after. We have encircled the rows in the snapspace matrix for the data blocks allocated in the snapshots with indexes 2 and 3. The sum of all the values in the encircled two rows (1+7) gives the number of data blocks allocated after the reliable snapshot.

What is claimed:

1. A method of replicating a primary file system on a primary host to a secondary file system on a secondary host, comprising:
- determining a primary data block to replicate by reading a space map block entry (b, e) of the primary data block, wherein b represents a first snapshot and e represents a last snapshot to use the primary data block, wherein the primary data block is unchanged between b and e;
- computing a checksum of the primary data block of the primary file system to replicate on the secondary file system;
- determining a version of a most recent snapshot replicated to the secondary file system;
- sending the primary data block number from the primary host to the secondary host when the version of the most recent snapshot replicated to the secondary file system is equal to or greater than the version of b of the space map block entry (b, e);
- using a number of the primary data block to determine a secondary data block that corresponds to the primary data block;
- computing a checksum of the secondary data block of the secondary file system;
- comparing the primary and secondary data block checksums on the primary host or the secondary host; and
- replicating the primary data block on the secondary file system when the primary and secondary data block checksums mismatch, and repeating the above steps for the remaining data blocks of the primary file system, wherein the primary data block belongs to one or more snapshots of the primary file system.

2. The method of claim 1, further comprising determining the version of b by reading an index table.

3. The method of claim 1, further comprising reading each space map block from the primary file system and sending the space map block to the secondary host.

4. The method of claim 1, wherein sending the number of the data block to the secondary host if the version of b is between the version of a reliable snapshot of the secondary file system and the version of the most recent snapshot replicated to the secondary file system.

5. A method of replicating a primary file system on a primary host to a secondary file system on a secondary host, comprising:
- determining a data block of the primary file system to replicate on the secondary file system that were allocated after a reliable snapshot on the secondary file system to the secondary host by:
- determining a version of a most recent snapshot replicated to the secondary file system;
- reading a space map block entry (b, e) of the data block, wherein b represents a first snapshot to use the data block, e represents a last snapshot to use the data block, and the data block is unchanged between b and e; and
- determining that the version of the most recent snapshot replicated to the secondary file system is equal to or greater than a version of b of the space map block entry (b, e), and the version of b is greater than a version of the reliable snapshot on the secondary file system;
- sending the number of the data block to the secondary host;
- computing a secondary checksum of a corresponding data block on the secondary host;
- sending the secondary checksum to the primary host;
- computing a primary checksum of the data block on the primary file system, and when the primary and secondary checksums do not match, sending the set of data blocks from the primary file system that were allocated after the reliable snapshot on the secondary file system to the secondary host, and writing the data blocks to the secondary file system.

6. The method of claim 5, further comprising reading each space map block from the primary file system and sending the space map block to the secondary host.

7. The method of claim 5, further comprising determining the version of b by reading an index table.

8. A method of replicating a primary file system on a primary host to a secondary file system on a secondary host, comprising:

(a) determining a data block of the primary file system to replicate on the secondary file system including reading a space map block entry (b, e) of the primary data block, wherein b represents a first snapshot to use the data block, e represents a last snapshot to use the data block, and the data block is unchanged between b and e;

(b) sending a number of the data block to the secondary host;

(c) computing a secondary checksum of a corresponding data block on the secondary host;

(d) computing a primary checksum of the data block on the primary file system;

(e) sending the data block from the primary host to the secondary host when the primary and secondary checksums do not match and repeating the above steps for all the other data blocks of the primary file system, or (f) determining a version of a most recent snapshot replicated to the secondary file system, and sending all the data blocks that were allocated after a reliable snapshot to the secondary file system from the primary host to the secondary host when the version of the most recent snapshot replicated to the secondary file system is equal to or greater than a version of b of the space map block entry (b, e) and the version of b is greater than a version of the reliable snapshot on the secondary file system;

(g) selecting step (e) or step (f) based on an estimated time to complete the data replication; and (h) writing the data blocks to the secondary file system.

9. The method of claim 8, further comprising reading each space map block from the primary file system and sending the space map block to the secondary host.

10. The method of claim 8, further comprising determining the version of b by reading an index table.

11. The method of claim 8, wherein the time to perform step (e) is estimated by the time to read the remaining data blocks from the primary file system and the time to perform step (f) is estimated by the time to read all the data blocks that were allocated after a reliable snapshot from the primary file system and send the data blocks to the secondary host.

12. The method of claim 11, wherein the time to complete step (f) is computed by reading a snapspace matrix and summing the number of data blocks that were allocated after a reliable snapshot from the primary file system.

13. The method of claim 12, wherein sending the number of the data block to the secondary host if the version of b is between the version of the reliable snapshot on the secondary file system and the version of the most recent snapshot replicated to the secondary file system.

* * * * *

UNITED STATES PATENT AND TRADEMARK OFFICE

CERTIFICATE OF CORRECTION

PATENT NO. : 8,433,683 B2
APPLICATION NO. : 13/134525
DATED : April 30, 2013
INVENTOR(S) : Shoens et al.

It is certified that error appears in the above-identified patent and that said Letters Patent is hereby corrected as shown below:

In the Drawings:

On Sheet 11 of 41, in figure 11A, Ref. Numeral 76, line 3, delete “To” and insert -- To Be --, therefor.

On Sheet 14 of 41, in figure 14, line 2, delete “11b” and insert -- 11B --, therefor.

In the Specifications:

In column 4, line 57, after “host” insert -- . --.

In column 7, line 14, delete “O-n” and insert -- 0-n --, therefor.

In column 11, line 48, delete “to” and insert -- to be --, therefor.

In the Claims:

In column 26, line 64, in Claim 5, after “host;” insert -- and --.

Signed and Sealed this
Twenty-seventh Day of August, 2013

Teresa Stanek Rea
*Acting Director of the United States Patent and Trademark Office*